United States Patent
Kudo

(10) Patent No.: US 8,111,419 B2
(45) Date of Patent: Feb. 7, 2012

(54) RASTERIZING DEVICE FOR DL OBJECT MANAGEMENT

(75) Inventor: Yasuhiro Kudo, Ichinomiya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 991 days.

(21) Appl. No.: 11/864,643

(22) Filed: Sep. 28, 2007

(65) Prior Publication Data

US 2008/0309673 A1    Dec. 18, 2008

(30) Foreign Application Priority Data

Sep. 29, 2006  (JP) ................. 2006-267570
Sep. 29, 2006  (JP) ................. 2006-267952

(51) Int. Cl.
*G06F 13/28* (2006.01)
(52) U.S. Cl. .................... 358/1.16; 358/1.15
(58) Field of Classification Search ............ 358/1.15, 358/1.16
See application file for complete search history.

(56) References Cited

U.S. PATENT DOCUMENTS

| | | | |
|---|---|---|---|
| 2003/0231346 A1 | 12/2003 | Tagawa | |
| 2004/0066529 A1 | 4/2004 | Wu et al. | |
| 2005/0055426 A1* | 3/2005 | Smith et al. | 709/219 |
| 2006/0192986 A1* | 8/2006 | Suzuki | 358/1.13 |
| 2007/0097416 A1* | 5/2007 | Higashimura et al. | 358/1.15 |

FOREIGN PATENT DOCUMENTS

| | | | |
|---|---|---|---|
| EP | 1415820 A1 | 5/2004 | |
| JP | 7281979 A | 10/1995 | |
| JP | 09114610 A | 10/1995 | |
| JP | 2000132349 A | 10/1998 | |
| JP | 2002091726 A | 3/2002 | |

(Continued)

OTHER PUBLICATIONS

Japan Patent Office; Notification of Reasons for Rejection in Japanese Patent Application No. 2006-267952 mailed Feb. 10, 2009.

(Continued)

*Primary Examiner* — Benny Tieu
*Assistant Examiner* — Qian Yang
(74) *Attorney, Agent, or Firm* — Baker Botts L.L.P.

(57) ABSTRACT

A rasterizing device is provided with a first storage area capable of storing a downloaded DL object, and a rasterizer that creates bit-mapped data in band units by rasterizing data. With respect to a predetermined band in which a predetermined DL object is to be included, the rasterizer performs following processes:

(1) the rasterizer downloads the predetermined DL object and stores it in the first storage area in a case where the predetermined DL object has not been stored in the first storage area, wherein the predetermined DL object is not downloaded in a case where the predetermined DL object has been stored in the first storage area;
(2) the rasterizer rasterizes the predetermined DL object stored in the first storage area; and
(3) the rasterizer deletes the predetermined DL object from the first storage area in a case where bit-mapped data of the predetermined DL object for the predetermined band is created and the predetermined DL object is not to be included in a band after the predetermined band, wherein the predetermined DL object is not deleted from the first storage area in a case where the predetermined DL object is to be included in the band after the predetermined band.

14 Claims, 18 Drawing Sheets

FOREIGN PATENT DOCUMENTS

| | | |
|---|---|---|
| JP | 2002096506 A | 4/2002 |
| JP | 2002174089 A | 6/2002 |
| JP | 2003-029940 A | 1/2003 |
| JP | 2003-0322940 A | 1/2003 |
| JP | 2003288193 A | 10/2003 |
| JP | 2005196751 A | 7/2005 |
| WO | 9115831 A1 | 10/1991 |

OTHER PUBLICATIONS

European Patent Office; Extended European Search Report in European Patent Application No. 07253859.8 mailed Apr. 19, 2010.

Office Action received on May 21, 2008, in corresponding Japanese Patent Application No. JP 2006-267952.

* cited by examiner

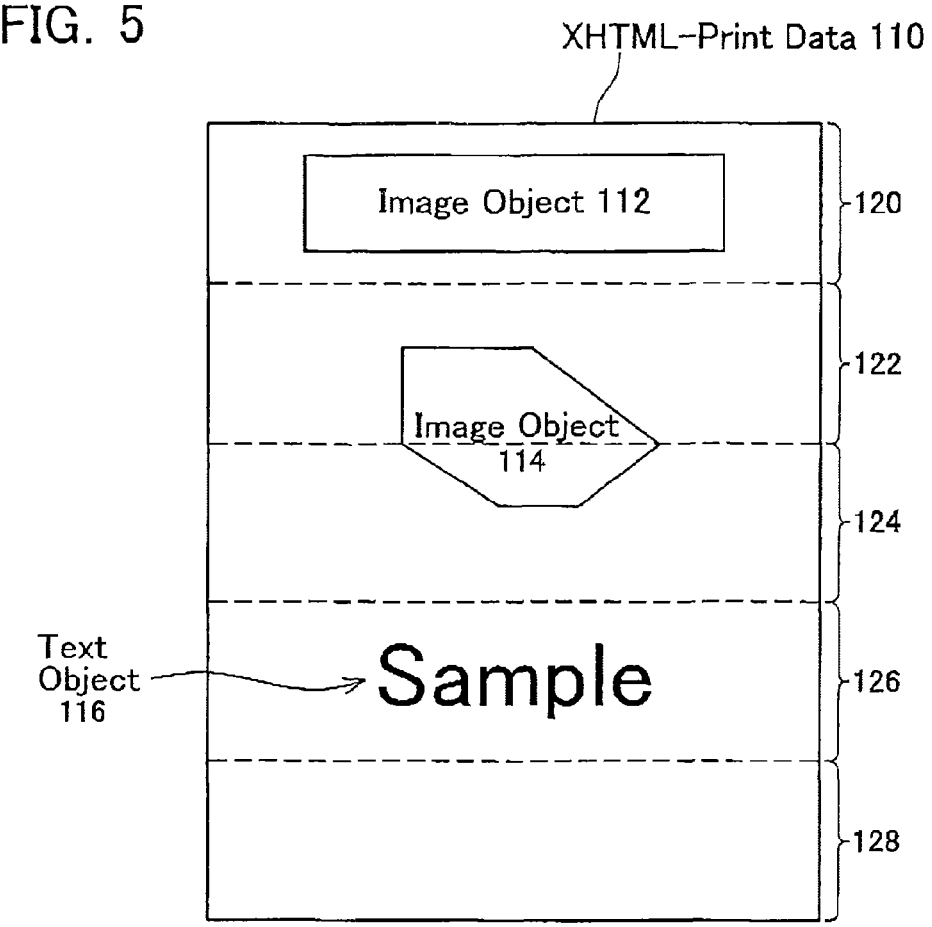

FIG. 12

| URL | Page Number | Area Number |
|---|---|---|
| http://server/img1.jpg | 1 | 5 |
| http://server/img2.jpg | 1 | 1 |
| http://server/img3.jpg | 2 | 2 |
| | | |

RASTERIZING DEVICE FOR DL OBJECT MANAGEMENT

CROSS-REFERENCE TO RELATED APPLICATION

This application claims priority to Japanese Patent Application No. 2006-267570, filed on Sep. 29, 2006, the contents of which are hereby incorporated by reference into the present application. This application also claims priority to Japanese Patent Application No. 2006-267952, filed on Sep. 29, 2006, the contents of which are hereby incorporated by reference into the present application.

BACKGROUND OF THE INVENTION

1. Field of the Invention

The technology disclosed in the present specification relates to technology for rasterizing data to create bit-mapped data.

2. Description of the Related Art

Background particulars of the technology disclosed is the present specification will be enumerated below.
(1) For example, a printer will be connected to an external device (PC, digital camera, portable media, etc.). When print data has been output from the external device, the printer rasterizes the print data to create bit-mapped data. The printer prints onto print media based upon the bit-mapped data that was created.
(2) An Object (referred to as DL object in the present specification) that should be downloaded from a communication network is sometimes included in the print data. For example, JPEG format image objects may be DL objects. The address on the communication network in which a DL object is stored is included in the print data. The printer will access the address included in the print data, and download the DL object from that address. The printer will rasterize the downloaded DL object to create bit-mapped data. For example, a printer that will download and rasterize a DL object is disclosed in Japanese Patent Application Publication No. 2002-91726.
(3) Some printers will divide the print data into a plurality of areas (bands) and sequentially create hit-mapped data for each area. In other words, there are printers that will sequentially create bit-mapped data in band units. For example, this type of printer is disclosed in Japanese Patent Application Publication No. 2002-96506.

BRIEF SUMMARY OF THE INVENTION

Although Japanese Patent Application Publication No. 2002-91726 discloses a printer that will download and rasterize a DL object, it does not disclose a printer that will create bit-mapped data in band units. In addition, although Japanese Patent Application Publication No. 2002-96506 discloses a printer that will create bit-mapped data in band units, it does not disclose a printer that will download and rasterize a DL object. These references do not disclose a printer that will create bit-mapped data in band units from data included in a DL object. No methodology is known for efficiently executing the process of creating bit-mapped data in band units from data including a DL object.

The present specification discloses a printer that can create bit-mapped data in band units from data included in a DL object.

The rasterizing device of the present invention will be described with reference to FIG. 1. FIG. 1 simply shows data that is to be rasterized. The data of FIG. 1 is simply an illustration. The technological scope of the present invention should not be narrowly interpreted by means of the content of FIG. 1 and the following explanation related thereto. The technological scope of the present invention is to be objectively established by claims.

The rasterizing device that is disclosed in the present specification is to be connected to a communication network. The rasterizing device is capable of rasterizing data that includes a DL object which is to be downloaded from the communication network. In the example of FIG. 1, data 10 including a DL object 20 will be rasterized. This rasterizing device comprises a first storage area that is capable of storing a downloaded DL object, and a rasterizer that rasterizes data to create bit-mapped data in band units. In the example of FIG. 1, the data 10 to be rasterized will be divided into a plurality of bands 30 to 38. The rasterizer will sequentially create each band 30 to 38 of bit-mapped data. In other words, bit-mapped data for band 30 will be created, and then bit-mapped data for band 32 will be created. Likewise, the bands 34, 36, 38 of bit-mapped data will be sequentially created.

The rasterizer will execute the following processes with respect to a predetermined band in which a predetermined DL object is included.
(1) The rasterizer downloads the predetermined DL object and store it in the first storage area in a case where the predetermined DL object has not been stored in the first storage area. The predetermined DL object is not downloaded in a case where the predetermined DL object has been stored in the first storage area.
(2) The rasterizer rasterizes the predetermined DL object stored in the first storage area.
(3) The rasterizer deletes the predetermined DL object from the first storage area in a case where bit-mapped data of the predetermined DL object is created for the predetermined band and the predetermined DL object is not to be included in a band after the predetermined band. The predetermined DL object is not deleted from the first storage area in a case where the predetermined DL object is to be included in the band after the predetermined band.

In the example of FIG. 1, the DL object 20 is arranged to bridge over the band 32 and the band 34 to be rasterized after the band 32. In this case, the DL object will not be deleted from the first storage area even if bit-mapped data of the DL object is created for the band 32. When bit-mapped data for the band 34 is to be created, it will not be necessary to download the DL object 20 again. The same DL object will be prevented from being downloaded several times. This rasterizing device can efficiently create bit-mapped data.

In addition, in the event the DL object 20 is included only in the band 32 (in the event that the DL object 20 is not included in the band 34 and thereafter), the DL object 20 will be deleted from the first storage area when bit-mapped data of the DL object 20 is to be created with respect to the band 32. The occurrence of the phenomenon in which unneeded data will continue to be stored for a long period of time will be prevented. This rasterizing device can efficiently use memory (the first storage area). This rasterizing device can efficiently create bit-mapped data in band units from data including a DL object.

Note that the phrase "delete the predetermined DL object from the first storage area" does not only mean that the DL object will be immediately deleted when the bit-mapped data of the predetermined DL object is created. For example, the timing at which the DL object will be deleted from the first storage area may be set to occur when the creation of the bit-mapped data for the next band is to begin. In addition, the DL object may be deleted from the first storage area in the event that another condition overlaps therewith. For example, the DL object may be deleted from the first storage area in the event that a large amount of data is stored in the first storage area (e.g., in the event that another DL object cannot be stored in the first storage area).

In addition, the phrase "the predetermined DL object is not deleted from the first storage area" means that the data format (e.g., vector format) before rasterization is not deleted, and/or the data format after rasterization is not deleted For example, the data format of the downloaded DL object 20 will be rasterized in the event that bit-mapped data of band 32 of FIG. 1 is to be created. The first storage area may continue to store the data format before rasterization of the downloaded DL object 20 after bit-mapped data of the DL object 20 was created for band 32 (i.e., the data format before rasterization is not be deleted). In this case, the DL object 20 will be rasterized again when bit-mapped data for band 34 is to be created.

In contrast, the first storage area may continue to store the data format after rasterization after bit-mapped data of the DL object 20 was created for band 32 (i.e., the data format after rasterization is not be deleted). In this case, the DL object 20 need not be rasterized when bit-mapped data of band 34 is to be created. This is because the data format after rasterization of the DL object 20 is stored in the first storage area.

BRIEF DESCRIPTION OF THE DRAWINGS

FIG. 5 shows a visual representation of print data.

FIG. 6 shows the data structure of the print data.

FIG. 12 shows an example of content that is stored in a position data storage area.

DETAILED DESCRIPTION OF THE PREFERRED EMBODIMENTS

First Embodiment

Figure 2:
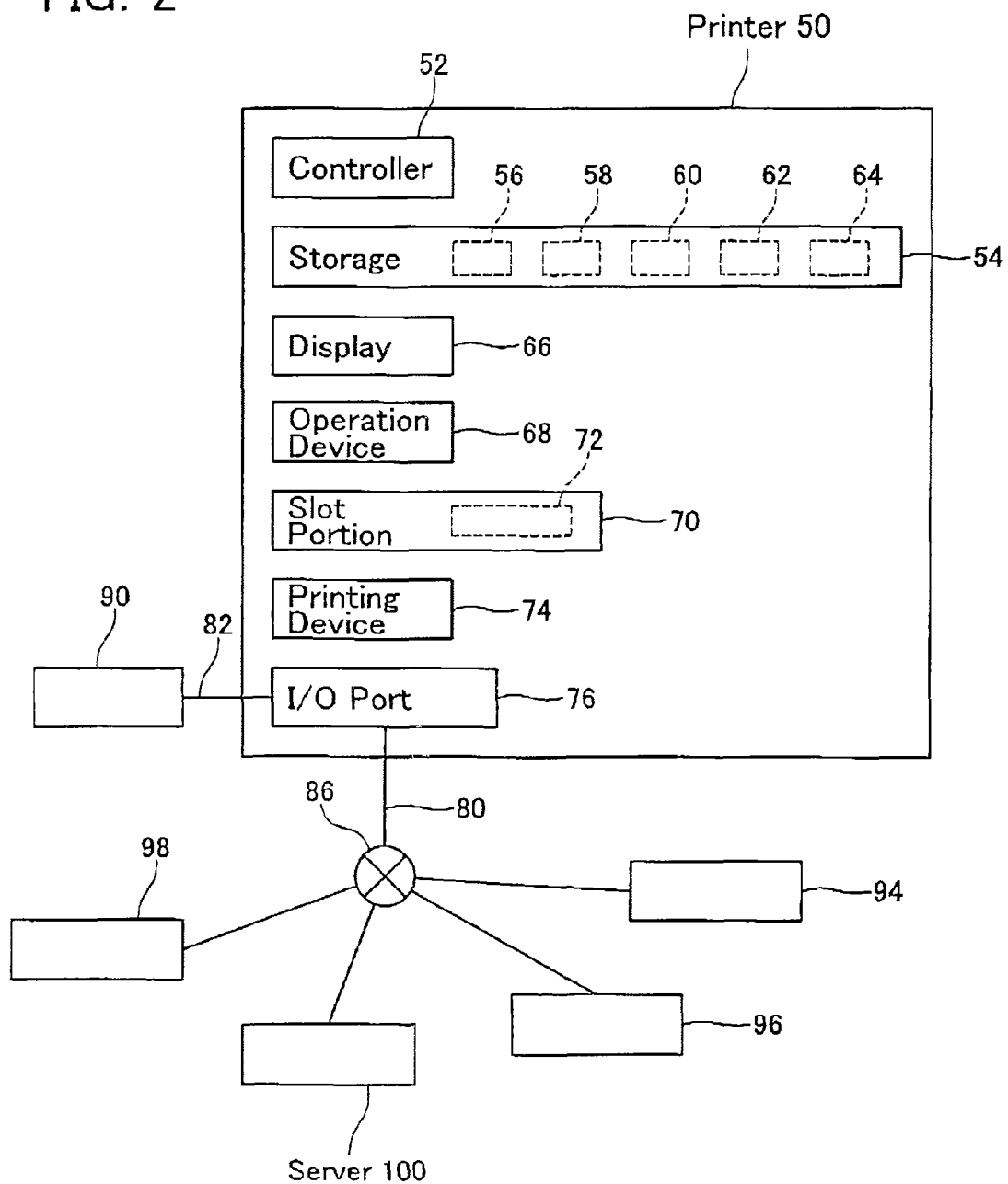
FIG. 2 shows the structure of a printer according to one embodiment.

A first embodiment will be described with reference to the drawings. FIG. 2 shows a printer 50 of the present embodiment. The printer 50 is connected to and used with Internet 86.

(Construction of the Printer)

The printer 50 has a controller 52, storage 54, a display 66, an operation device 68, a slot portion 70, a printing device 74, and an I/O port 76. The controller 52 includes a CPU etc. The controller 52 will comprehensively control each process that the printer 50 executes. For example, the controller 52 can execute a process that will rasterize print data and create bit-mapped data. The controller 52 will function as a rasterizer. The storage 54 includes ROM, RAM, EEPROM, etc. The storage 54 stores programs that allow the controller 52 to perform each process. In addition, the storage 54 can store various types of data produced in the steps executed by the aforementioned programs. The storage 54 has storage areas 56, 58, 60, 62, and 64. The content of the data stored in each storage area 56 to 64 will be described below. The storage 54 (the storage areas 56 to 64) may be a hard disc drive or the other type of memory. It is possible to adopt various types of storing devices as the storage 54.

The DL object storage area 56 can store DL objects (image data) that were downloaded from the Internet 86. The DL objects will be described later. The first bit-mapped data storage area 58 can store at least one band of bit-mapped data. The bands will be described later. The second bit-mapped data storage area 60 can also store at least one band of bit-mapped data. The process data storage area 62 can store print data and layout data that was converted from the print data. The print data and the layout data will be described later. The position data storage area 64 is used in the second embodiment noted below. The content of the data stored in the position data storage area 64 will be described later.

The display 66 is a liquid crystal display, etc. The display 66 can display various types of data. The operation device 68 includes a plurality of keys. A user can input various types of data into the printer 50 by operating the operation device 68. The slot portion 70 can receive various types of memory cards 72. The printing device 74 is an inkjet type or laser type of printing device. The printing device 74 can print on printing sheets not shown in the drawings. An Internet line 80 and a LAN line 82 are connected to the I/O port 76. The Internet line 80 is connected to the Internet 86. The printer 50 is capable of communicating with various devices 94, 96, 98, 100 via the Internet 86. The LAN line 82 is connected to a PC 90. The printer 50 can communicate with the PC 90.

A user can command the printer 50 to print the content displayed on the PC 90 by operating the PC 90. In this case, the print data will be sent to the printer 50 from the PC 90. The printer 50 will print based upon the print data sent from the PC 90. In addition, a user can command the printer 50 to print the data stored in the memory card 72 by operating the operation device 68. In this case, the printer 50 will receive the print data stored in the memory card 72, and print based upon that print data.

(Processes Executed by the Printer)

Figure 3:
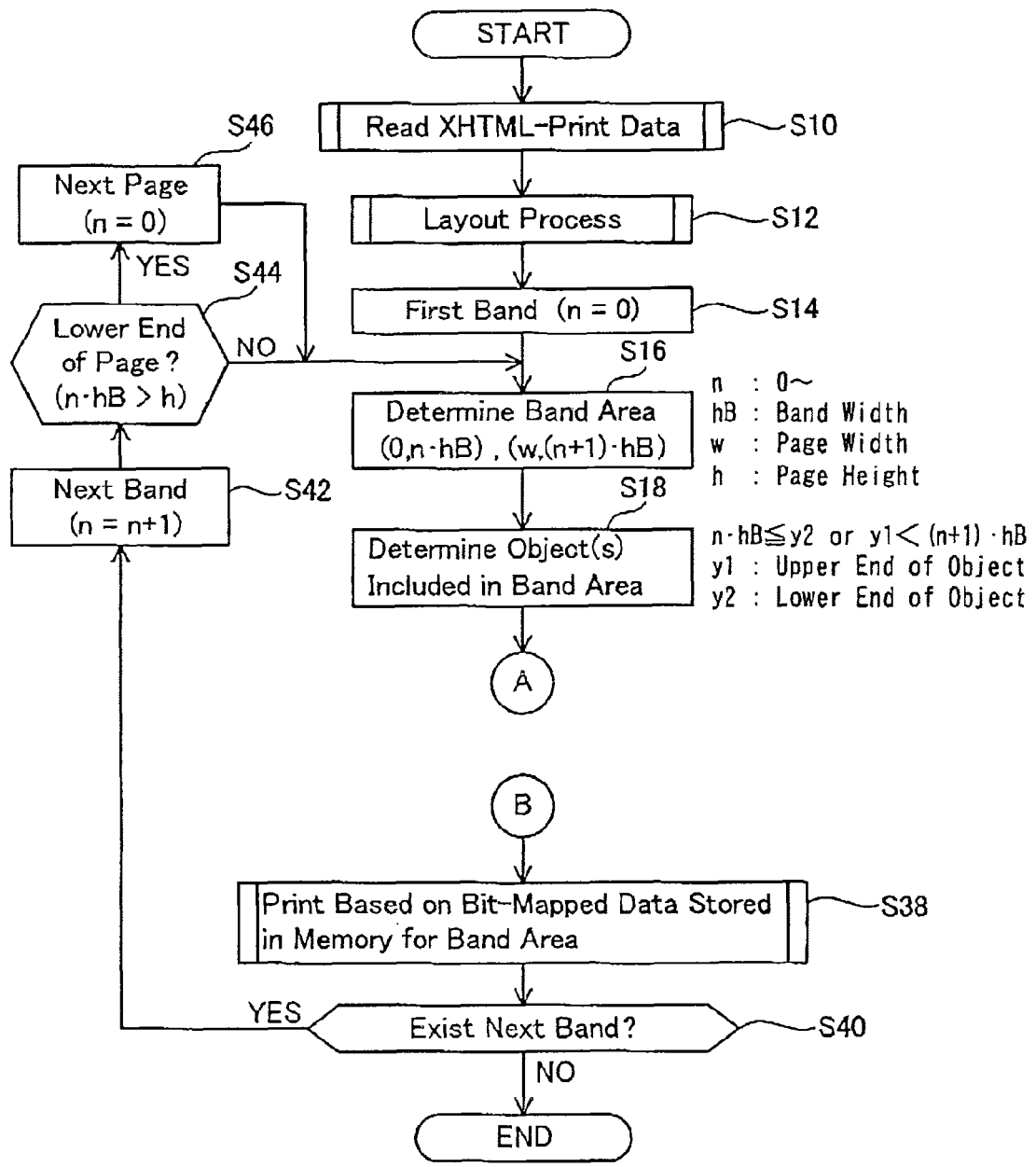
FIG. 3 shows a flowchart of a process executed by the printer.
Figure 4:
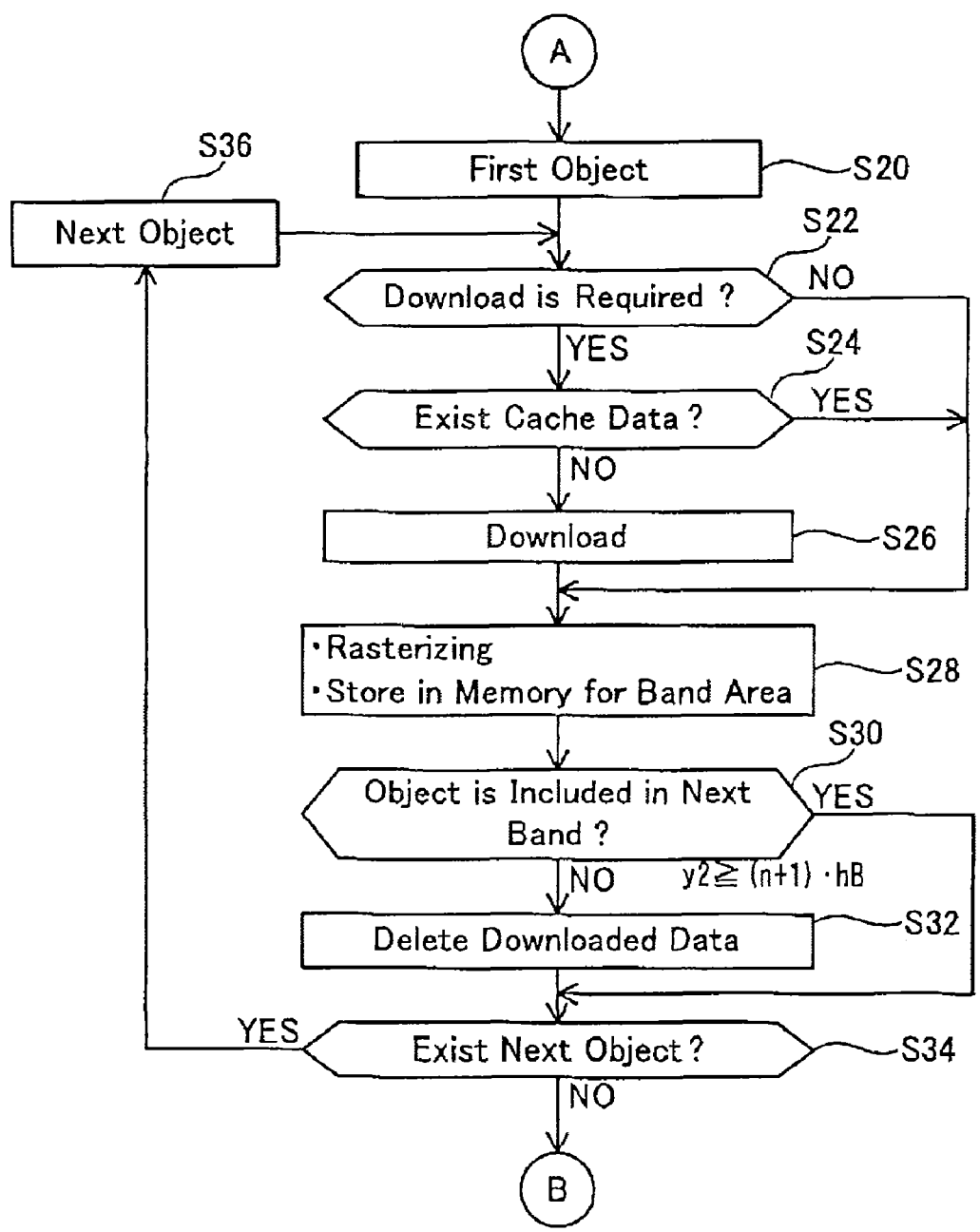
FIG. 4 shows a flowchart of a process executed by the printer (continuation of FIG. 3).

The printing process executed by the printer 50 will be described. This printing process will be executed by the controller 52 FIG. 3 and FIG. 4 show a flowchart of the printing process executed by the printer 50. This printing process will be executed in a case where print data has been sent from the PC 90, or a case where the printer has been commanded to print the print data stored in the memory card 72. A case in which print data stored in the memory card 72 is to be printed will be described below as an example. The printer 50 will read the print data stored in the memory card 72 (S10). This print data will be stored in the process data storage area 62 (see FIG. 2). FIG. 5 shows a visual representation of the print data stored in the memory card 72. The print data 110 is XHTML-Print data In order to print the XHTML-Print data 110, it will be necessary to rasterize the data 110 to create bit-map format data.

The print data 110 of FIG. 5 includes three objects 112, 114, 116. The objects 112, 114 are JPEG format image objects. The image data of the image objects 112, 114 is not included in the print data 110. The image data of each image object 112, 114 is stored in another device on the Internet 86. The print data 110 includes the Internet address at which the image data of each image object 112, 114 is stored. The printer 50 will download the image data of each image object 112, 114 from the Internet 86 by accessing the address that is included in the print data 110. In this way, the printer 50 will be able to create bit-mapped data for each image object 112, 114. Each image object 112, 114 is an object that must be downloaded from the Internet 86, and will be hereinafter referred to as a "DL object". Note that in the present embodiment, the image data of each image object 112, 114 is stored in the server 100 shown in FIG. 2. The object 116 of FIG. 5 is a text object. The printer 50 can create bit-mapped data from the text object 116, and print the text (Sample) of the text object 116 on print media In other words, the text object 116 need not be downloaded from the Internet 86.

FIG. 6 shows the data structure of the XHTML-Print data 110 of FIG. 5. The print data 110 of FIG. 6 includes data 132 corresponding to the image object 112, data 134 corresponding to the image object 114, and data 136 corresponding to the text object 116. The data 132 indicates that it is JPEG format image data (img1.jpg). In addition, the data 132 includes the Internet address at which the image data is stored (not shown in FIG. 6). In other words, the data 132 includes the address (URL) of the server 100 (see FIG. 2). The data 134 indicates that it is SVG (Scalable Vector Graphics) format image data (img2.svg). The data 134 includes the Internet address at which the image data is stored (the address of the server 100). The data 136 includes the word "Sample" as text data.

Figure 7:
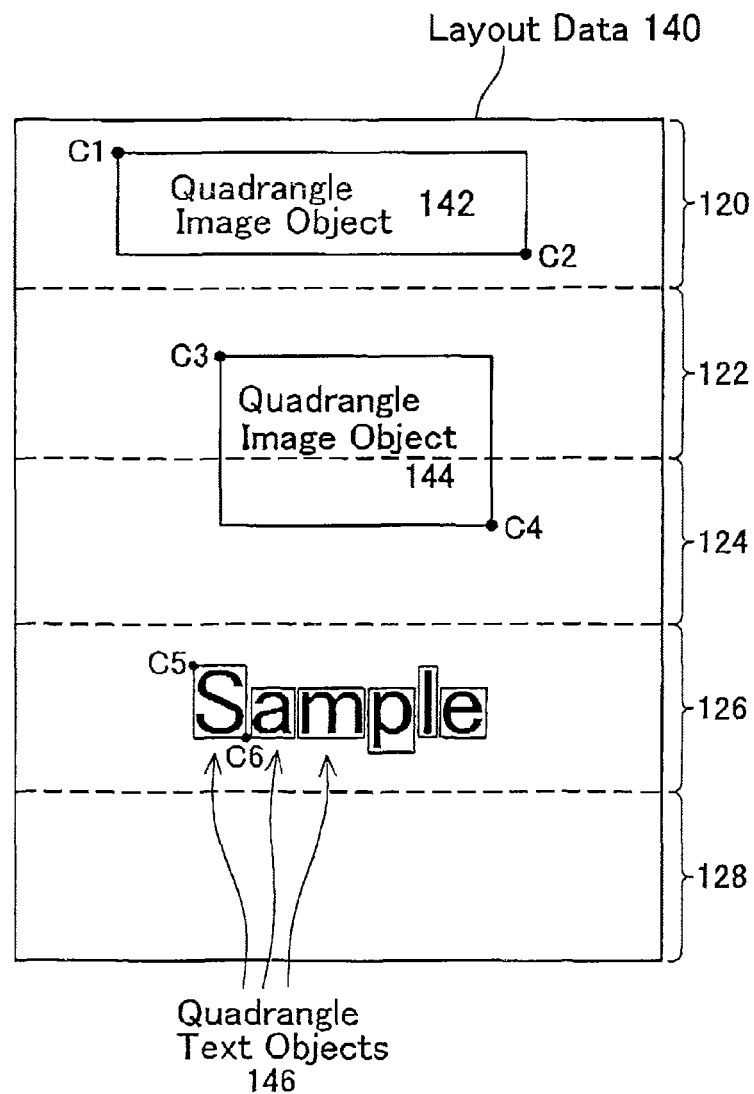
FIG. 7 shows a visual representation of layout data.
Figure 8:
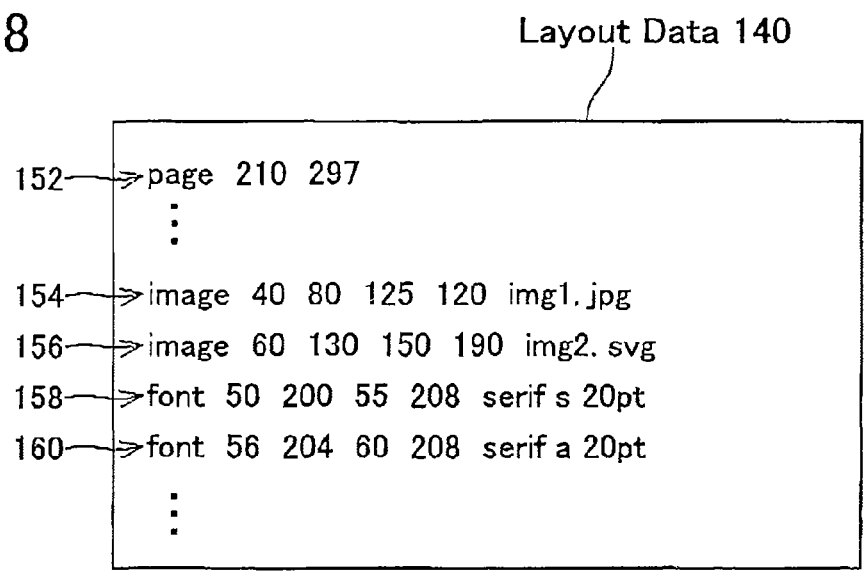
FIG. 8 shows the data structure of the layout data.

The printer 50 will execute a layout process when S10 of FIG. 3 is complete (S12). In the layout process, each object 112, 114, 116 included in the XHTML-Print data 110 that was read in at S10 will be converted to a quadrangle object. The layout process will be described with reference to FIG. 7 and FIG. 8. FIG. 7 shows a visual representation of data 140 (layout data 140) after the print data 110 of FIG. 5 has been converted by the layout process. FIG. 8 shows the data structure of the layout data 140 of FIG. 7.

The image object 112 of FIG. 5 will be converted to a quadrangle image object 142 of FIG. 7. The quadrangle image object 142 is positioned by two coordinates C1, C2 of a quadrangle that approximately circumscribes the image object 112. Because the image object 112 is itself a quadrangle, the quadrangle image object 142 has the same quadrangle as the image object 112. The coordinate C1 and the coordinate C2 are two coordinates that are positioned on one diagonal line of the quadrangle (hereinafter referred to as diagonal coordinates). The data 154 of FIG. 8 corresponds to the quadrangle image object 142 of FIG. 7. "40 80" of data 154 corresponds to the coordinate C1. "125 120" of data 154 corresponds to the coordinate C2.

The image object 114 of FIG. 5 will be converted to a quadrangle image object 144 of FIG. 7. The quadrangle image object 144 is positioned by diagonal coordinates C3, C4 of a quadrangle that approximately circumscribes the image object 114. The data 156 of FIG. 8 corresponds to the quadrangle image object 144 of FIG. 7. "60 130" of data 156 corresponds to the coordinate C3. "150 190" of data 156 corresponds to the coordinate C4.

The text object 116 of FIG. 5 will be converted to the quadrangle text object group 146 of FIG. 7. The text object 116 is the 6 letters of the word "Sample". In this case, each of the six letters will be converted to a quadrangle text object 146. For example, the letter "S" is positioned by the diagonal coordinates C5, C6 of the quadrangle that approximately circumscribes the "S". The data 158 of FIG. 8 corresponds to the quadrangle text object 146 of the letter "S" of FIG. 7. "50 200" of data 158 corresponds to the coordinate C5. "55 208" of data 158 corresponds to the coordinate C6. In addition, "serif s 20 pt" of data 158 means that the letter "S" is in 20 point font. Likewise, each of the other letters "a," "m," "p," "l," and "e" will be converted to quadrangle text objects 146. In FIG. 8, only the data 158 that corresponds to the letter "S" and the data 160 that corresponds to the letter "a" are shown. The data corresponding to the other letters "m," "p," "l," and "e" are not shown in the drawings. Note that the data 152 of FIG. 8 shows the dimensions of the printing sheet (vertical 210, horizontal 297).

Note that the layout data 140 may include the following data in addition to the data shown in FIG. 8.
(1) One coordinate of an apex of the quadrangle object, and the vertical and horizontal lengths of the quadrangle.
(2) One coordinate of an apex of the quadrangle object, and the diagonal length of the quadrangle.
(3) The size of the quadrangle object.
(4) The rotation angle of the quadrangle object.
(5) The color of the letters in the quadrangle text object.
(6) The color of the background in the quadrangle image object.
(7) The page number of the printing sheet.

In addition, it is preferred that the layout data 140 is sorted in the order in which each quadrangle object is to be printed.

The layout data 140 will be stored in the process data storage area 62 (see FIG. 2). The printer 50 will proceed to S14 when the layout process (S12 of FIG. 3) is executed. In S14, the first band will be specified. "n" will be used as a reference symbol to specify the band. The first band is "n=0", and thereafter increases. A simple description of the bands will be provided. The printer 50 will rasterize the print data 110 to create bit-mapped data. The printer 50 will print onto print media based upon the bit-mapped data. A method has been considered in which printing is initiated after the bit-mapped data of all print data 110 has been created. However, in this case, a large capacity memory that can store the bit-mapped data of all print data 110 will be needed. The printer 50 of the present embodiment will use a method that creates bit-mapped data in band units in order to compress the memory capacity for storing the bit-mapped data. The print data 110 will be divided into a plurality of bands. In FIG. 5 and FIG. 7, the bit-mapped data is divided into five bands 120, 122, 124, 126 and 128. Each of the bands 120 to 128 of the bit-mapped data will be created in the sequence that they are to be printed on print media When one band (e.g., band 120) of bit-mapped data is created, the printing of that band will be executed. While the printing of that band is being performed, the next band of bit-mapped data (e.g., band 122) will be created. This will be repeated until the last band. When the bit-mapped data is created in band units, the memory capacity for storing the bit-mapped data can be compressed because the bit-mapped data of the bands that have been printed can be deleted.

When the printer 50 specifies the first band in S14 of FIG. 3 (the band 120 in the present embodiment), the band area of that band 120 will be determined (S16). The band area will be demarcated by two coordinates (0, n×hB), (w, (n+1)×hB). "n" is a number that will specify the band. n=0 in the case of the first band. "hB" indicates the band width (the vertical length (up and down direction) of one band in FIG. 7). The band width hB may be a fixed value, or may be a variable value. For example, the band width hbB may be changed based upon the memory capacity, the dimensions of the printing sheets, the print resolution, etc. The band width may be changed for each band, or may be change for each print data. The two coordinates (0, n×hB), (w, (n+1)×hB) that demarcate the band area are arranged on one diagonal line of a quadrangle band. For example, the two coordinates that demarcate the band 120 (n=0) are (0, 0), (w, hB). (0, 0) are the coordinates of the upper left apex of the band 120, and (w, hB) are the coordinates of the lower right apex of the band 120.

The printer 50 will specify the object that is to be included in the band area that was determined in S16 (S18). First, the printer 50 will determine the upper edge y coordinate (hereinafter "y1") and the lower edge y coordinate (hereinafter "y2") for each quadrangle object 142, 144, 146. For example, with the quadrangle object 142, y1 is 80, and y2 is 120 (see FIG. 8). In another example, with the quadrangle object 144, y1 is 130, and y2 is 190. In S18, the objects in which y1 or y2 are to be included between n×hB and (n+1)×hB will be determined. For example, with band 120, the objects in which y1 or y2 are to be included between zero and hB will be determined. In the present embodiment, the quadrangle image object 142 will be specified. Note that in a case where a plurality of quadrangle objects are included in one band, all quadrangle objects will be determined in S18. For example, with band 126, six quadrangle text objects 146 will be determined.

The printer 50 will select one object from the group of objects specified in S18 (S20 in FIG. 4). Next, the printer 50 will determine whether or not the object selected in S20 needs to be downloaded from the Internet 86 (S22). In other words, it will be determined whether or not the object is a DL object. For example, with band 120, the quadrangle image object 142 will be selected in S20. In this case, it will be determined that the answer is YES in S22. In a case where the answer is YES in S22, the process will proceed to S24. In a case where the answer is NO in S22, the process will skip S24 and S26, and proceed to S28.

The printer 50 will determine whether or not the image data of the quadrangle image object in which the answer was determined to be YES in S22 has been downloaded (S24). As noted above, the downloaded image data will be stored in the DL object storage area 56 of FIG. 2. In S24, the answer will be determined to be YES in a case where the image data of the quadrangle image object in which the answer was determined to be YES in S22 is stored in the DL object storage area 56. In a case where the answer is YES in S24, the process will skip S26 and proceed to S28. On the other hand, the process will proceed to S26 in a case where the answer is NO in S24. In S26, the image object (image data) will be downloaded from the Internet 86. For example, the quadrangle image object 142 included in band 120 includes the address of the server 100 (see FIG. 2). The printer 50 will access the server 100 and download the image data of the quadrangle image object 142. The printer 50 will cause the downloaded image data to be stored in the DL object storage area 56.

In S28, the rasterization of the object selected in S20 will be performed. In other words, the size of the dots (there may be no dots) and the color to be printed in each coordinate inside the area in which the object is to occupy will be determined. The density of the coordinates will depend upon the resolution of the printing. Various well-known methods can be used to perform rasterization. For example, a half tone process, dither method, etc. can be used to perform rasterization. For example, with band 120, the printer 50 will rasterize the quadrangle image object 142 stored in the DL object storage area 56. The bit-mapped data of the quadrangle image object 142 that was obtained by rasterization is stored in the first bit-mapped data storage area 58 (see FIG. 2). In this way, the bit-mapped data of the band 120 will be created.

Note that the bit-mapped data for the band 122 that is to be rasterized after the band 120 is stored in the second bit-mapped data storage area 60 (see FIG. 2). In addition, the bit-mapped data for the band 124 will be stored in the first bit-mapped storage area 58. In this case, the bit-mapped data for the band 120 will be deleted from the first bit-mapped storage area 58. In addition, the bit-mapped data for the band 126 will be stored in the second bit-mapped storage area 60. In this case, the bit-mapped data for the band 122 will be deleted from the second bit-mapped storage area 60. The bit-mapped data for the band 128 will be stored in the first bit-mapped storage area 58. In this case, the bit-mapped data for the band 124 will be deleted from the first bit-mapped storage area 58. The bit-mapped data for each band 120 to 128 will be alternately stored in the first bit-mapped storage area 58 and the second bit-mapped data storage area 60.

The printer 50 will determine whether or not the object that was rasterized in S28 is to be included in the band in which the next bit-mapped data is to be created (S30). This process will determine the answer is YES in a case where the y coordinate of the lower edge (y2) of the object rasterized in S28 is larger than (n+1)×hB. For example, the quadrangle image object 142 of the band 120 is not included in the band 122. In this case, it will be determined that the answer is NO in S30. Note that the process of S30 will only be performed in a case where the object that was rasterized in S28 is a quadrangle image object. In a case where the object that was rasterized in S28 is a quadrangle text object, S30 and S32 will be skipped. In a case where the answer in S30 is NO, the printer 50 will delete the image data of the quadrangle image object that was rasterized in S28 (S32). Note that in a case where the answer is YES in S30, S32 will be skipped.

The printer 50 will determine whether or not there is an object amongst the objects specified in S18 in which rasterization has not been performed (S34). For example, only one quadrangle image object 142 is included in band 120, and other objects are not included. In this case, it will be determined that the answer is NO in S34. On the other hand, in a case where the answer is YES in S34, the printer 50 will select the next object (S36); and will perform the processes in S22 and thereafter on the selected object.

In a case where the answer is NO in S34, printing will be performed on print media based upon the bit-mapped data stored in the first bit-mapped data storage area 58 or the second bit-mapped data storage area 60 (S38 in FIG. 3). For example, the bit-mapped data of the band 120 will be stored in the first bit-mapped storage area 58. Because of this, the printing process of the band 120 will be performed based upon the bit-mapped data stored in the first bit-mapped data storage area 58. The printing process of S38 will be performed by means of the controller 52 issuing a command to the printing device 74 (see FIG. 2).

If printing is initiated in S38, the printer 50 will determine whether or not there is a next band (S40). For example, in a case where S16 to S38 have been completed with respect to band 120, the answer in S40 will be determined to be YES because the next band 122 is present. In a case where the answer is YES in S40, the printer 50 will specify the next band (n=n+2) (S42). For example, in a case where S16 to S38 have been completed with respect to the band 120 (n=0), the band 122 will be specified (n=1). Next, the printer 50 will determine whether or not the band specified in S42 extends over the trailing edge of one printing sheet (S44). In a case where n×hB is larger than h (the vertical length of the printing sheet), the answer will be determined to be YES. In a case where the answer is YES in S44, the printer 50 will determine that the band will be printed on the next printing sheet (S42). In this case, the number (n) that specifies the band will be cleared and become zero. In a case where S46 has been completed, or the answer in S44 is NO, the process will proceed to S16. In this way, the processes of S16 to S38 will be performed with respect to the next band.

The processes of S16 to S38 noted above will be performed with respect to each band 122 to 128. The content of the processes to be performed with respect to band 122 will be simply described. These processes will be performed while the bit-mapped data for band 120 is being printed on a printing sheet. In S18, the quadrangle image object 144 (the image object 114) will be specified. In S22, it will be determined that the answer is YES. In S24, it will be determined that the answer is NO. In S26, the image data of the quadrangle image object 144 will be downloaded. The image data will be stored in the DL object storage area 56. In S28, the image data of the quadrangle image object 144 will be rasterized. As shown in FIG. 7, the quadrangle image object 144 is arranged across band 122 and band 124. In this case, only the portion of the bit-mapped data obtained by rasterizing the quadrangle image object 144 and to be included in the band 122 will be stored in the second bit-mapped data storage area 60. In this way, the bit-mapped data of the band 122 will be created. In S30, it will be determined that the answer is YES. This is because the quadrangle image object 144 will be included in the band 124 to be rasterized next. In this case, the downloaded image data will not be deleted (S32 will be skipped).

Next, the content of the processes to be performed with respect to band 124 will be simply described. These processes will be performed while the bit-mapped data for band 122 is being printed on a printing sheet. In S18 the quadrangle image object 144 (the image object 114) will be specified. In S22, it will be determined that the answer is YES. In S24, it will be determined that the answer is YES. This is because the image data of the quadrangle image object 144 is downloaded when the bit-mapped data for the band 122 is to be created. In S28, the image data of the quadrangle image object 144 will be rasterized. Only the portion of the bit-mapped data obtained by rasterizing the quadrangle image object 144 and to be included in the band 124 will be stored in the first bit-mapped data storage area 58. In other words, the band 120 of bit-mapped data will be deleted, and the bit-mapped data for band 124 will be stored. In this way, the bit-mapped data of the band 124 will be created. Because the printing of the band 120 is completed, there will be no problem if the bit-mapped data for the band 120 is deleted. In S30, it will be determined that the answer is NO. This is because the quadrangle image object 144 is not included in the band 126. In this case, the image data of the quadrangle image object 144 will be deleted from the DL object storage area 56 (S32).

In addition, the content of the processes to be performed with respect to band 126 will be simply described. These processes will be performed while the bit-mapped data for band 124 is being printed on a printing sheet. In S18, six quadrangle text objects 146 will be specified. The processes of S22 and thereafter will be performed with respect to each object 146. In S22, it will be determined that the answer is NO. In S28; the quadrangle text objects 146 will be rasterized. The bit-mapped data obtained by rasterization will be stored in the second bit-mapped storage area 60. In other words, the band 122 of bit-mapped data will be deleted, and the bit-mapped data for band 126 will be stored. In this way, the bit-mapped data of the band 126 will be created. S30 and S32 will be skipped. In S34, it will be determined that the answer is NO in a case where the processes with respect to all 6 of the objects 146 have been completed.

Note that an object is not included in band 128. In other words, an object has not been specified in S18. In this case, S20 to S38 will be skipped, and the process will proceed to S40. In S40, it will be determined that the answer is NO. This is because band 128 is the final band. In this way, all processes will be completed.

In the present embodiment, the quadrangle image object 144 (the image object 114) is arranged across band 122 and band 124 (see FIG. 5 and FIG. 7). The printer 50 will not delete the image data of the quadrangle image object 144 from the DL object storage area 56, even if the printer 50 rasterizes the image data of the quadrangle image object 144 in order to create bit-mapped data for band 122. Because of this, when the printer 50 creates the bit-mapped data for band 124, it will not be necessary to download the image data of the quadrangle image object 144 again. The same DL object will be prevented from being downloaded several times. The printer 50 can efficiently rasterize the print data.

In addition, the printer 50 will delete the image data of the quadrangle image object 144 from the DL object storage area 56 when the printer 50 rasterizes the image data of the quadrangle image object 144 in order to create bit-mapped data for band 124. The occurrence of the phenomenon in which unneeded data will continue to be stored for a long period of time will be prevented. The printer 50 can efficiently use memory (the DL object storage area 56).

In addition, in the present embodiment, each object 112 to 116 to be included in the print data will be converted into quadrangle objects 142 to 146. Each object will be positioned by means of the coordinates of a simple quadrangle. Because of this, the rasterizer can easily determine an object to be included inside a band. In other words, the processes of S18 of FIG. 3 and S30 of FIG. 4 can be easily performed.

(Modification of the First Embodiment)

In the aforementioned first embodiment, all image data of the quadrangle image object 144 will be rasterized when the bit-mapped data for band 122 is to be created (S28). The portion of the bit-mapped data of the quadrangle image object 144 to be included in the band 122 will be cut from all the bit-mapped data of the quadrangle image object 144, and that portion will be stored in the second bit-mapped data storage area 60 (S28). In this way, bit-mapped data of the quadrangle image object 144 will be created with respect to the band 122.

In addition, when bit-mapped data for band 124 is to be created, all of the image data of the quadrangle image object 144 will be rasterized again (S28). The portion of the bit-mapped data of the quadrangle image object 144 to be included in the band 124 will be cut from all the bit-mapped data of the quadrangle image object 144, and that portion will be stored in the first bit-mapped data storage area 58 (S28). In this way, bit-mapped data of the quadrangle image object 144 will be created with respect to the band 124. Thereafter, the image data of the quadrangle image object 144 will be deleted from the DL object storage area 56 (S32).

Each of the aforementioned processes can be modified as follows. When bit-mapped data for band 122 is to be created all of the image data of the quadrangle image object 144 will be rasterized. The portion of the bit-mapped data of the quadrangle image object 144 to be included in the band 122 will be cut, and that portion will be stored in the second bit-mapped data storage area 60. Up to here, this is the same as in the first embodiment. The bit-mapped data of the quadrangle image object 144 obtained, by this rasterization will be stored in the DL object storage area 56. In this case, the image data of the quadrangle image object 144 (the downloaded format of the data) is preferably deleted from the DL object storage area 56. When bit-mapped data for band 124 is to be created, the image data of the quadrangle image object 144 will not be rasterized again. The portion of the bit-mapped data of the quadrangle image object 144 to be included in band 124 will be read from the DL object storage area 56, and that portion will be stored in the first bit-mapped data storage area 58. In this way, bit-mapped data of the quadrangle image object 144 will be created with respect to the band 124. Thereafter, the bit-mapped data of the quadrangle image object 144 will be deleted from the DL object storage area 56. According to this modification, the occurrence of the phenomenon in which the same image data is rasterized several times can be prevented. According to this modification, bit-mapped data can be efficiently created.

Second Embodiment

Figure 9:
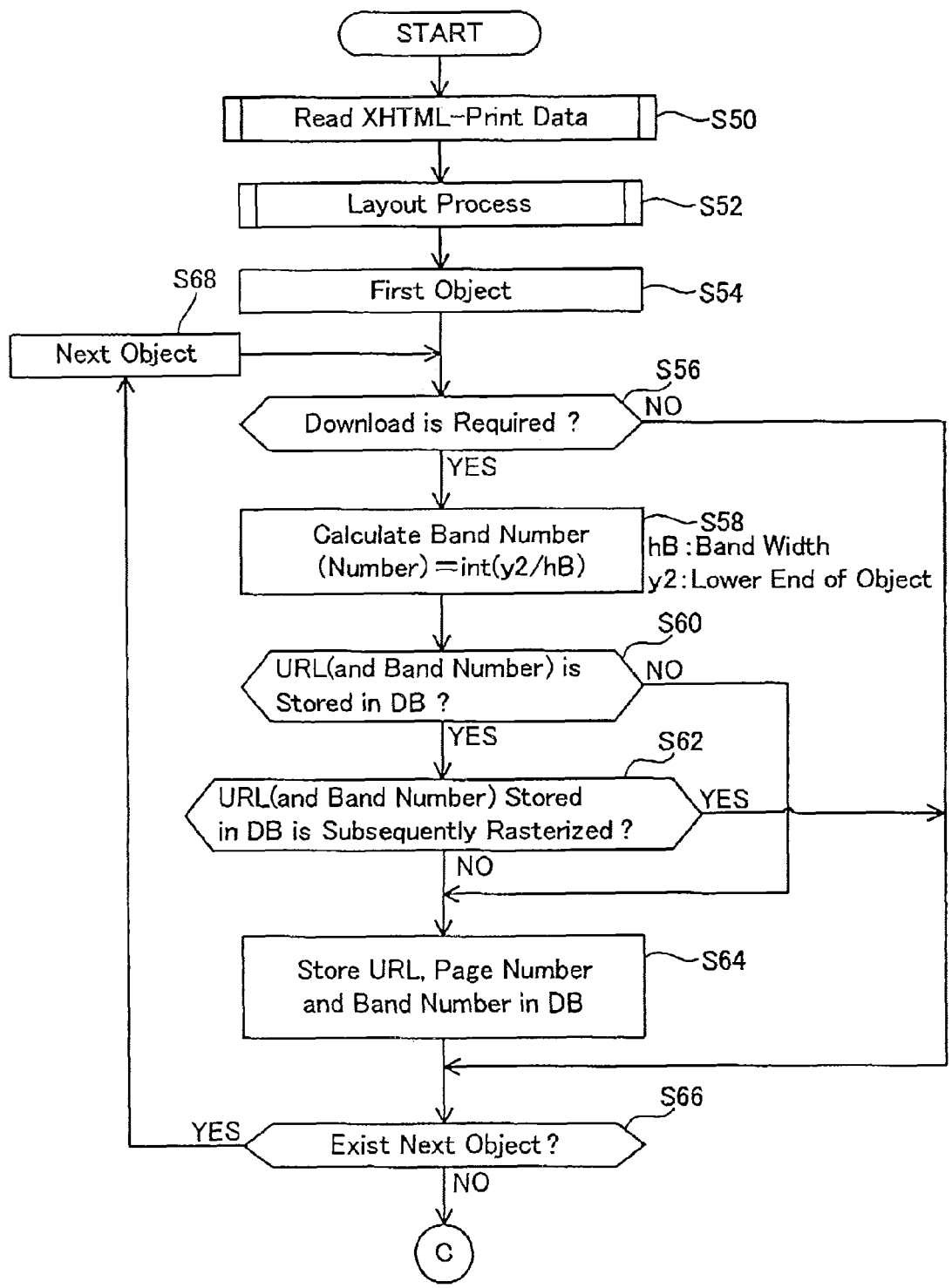
FIG. 9 shows a flowchart of a process executed by the printer (second embodiment).
Figure 10:
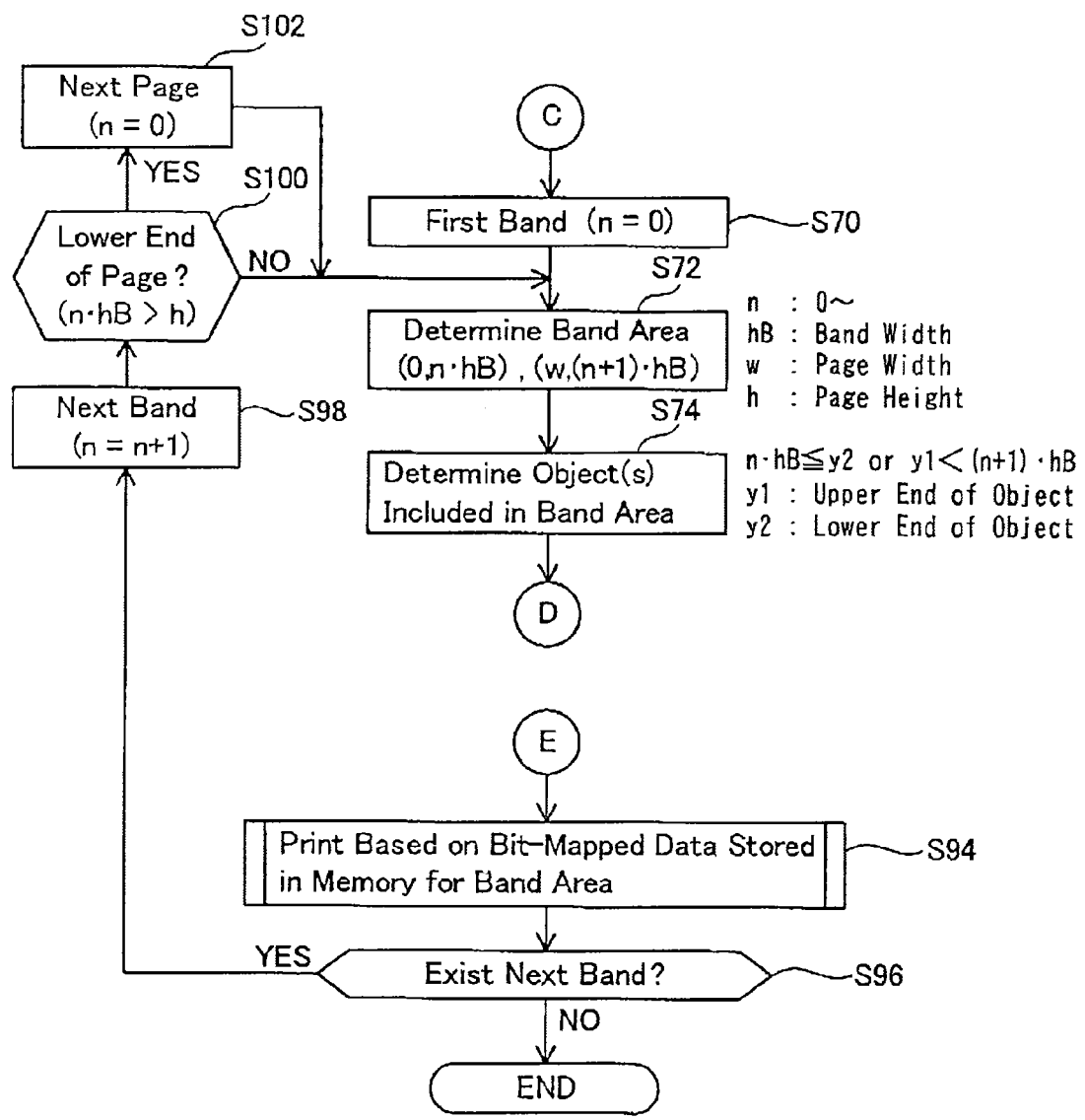
FIG. 10 shows a flowchart of a process executed by the printer (continuation of FIG. 9).
Figure 11:
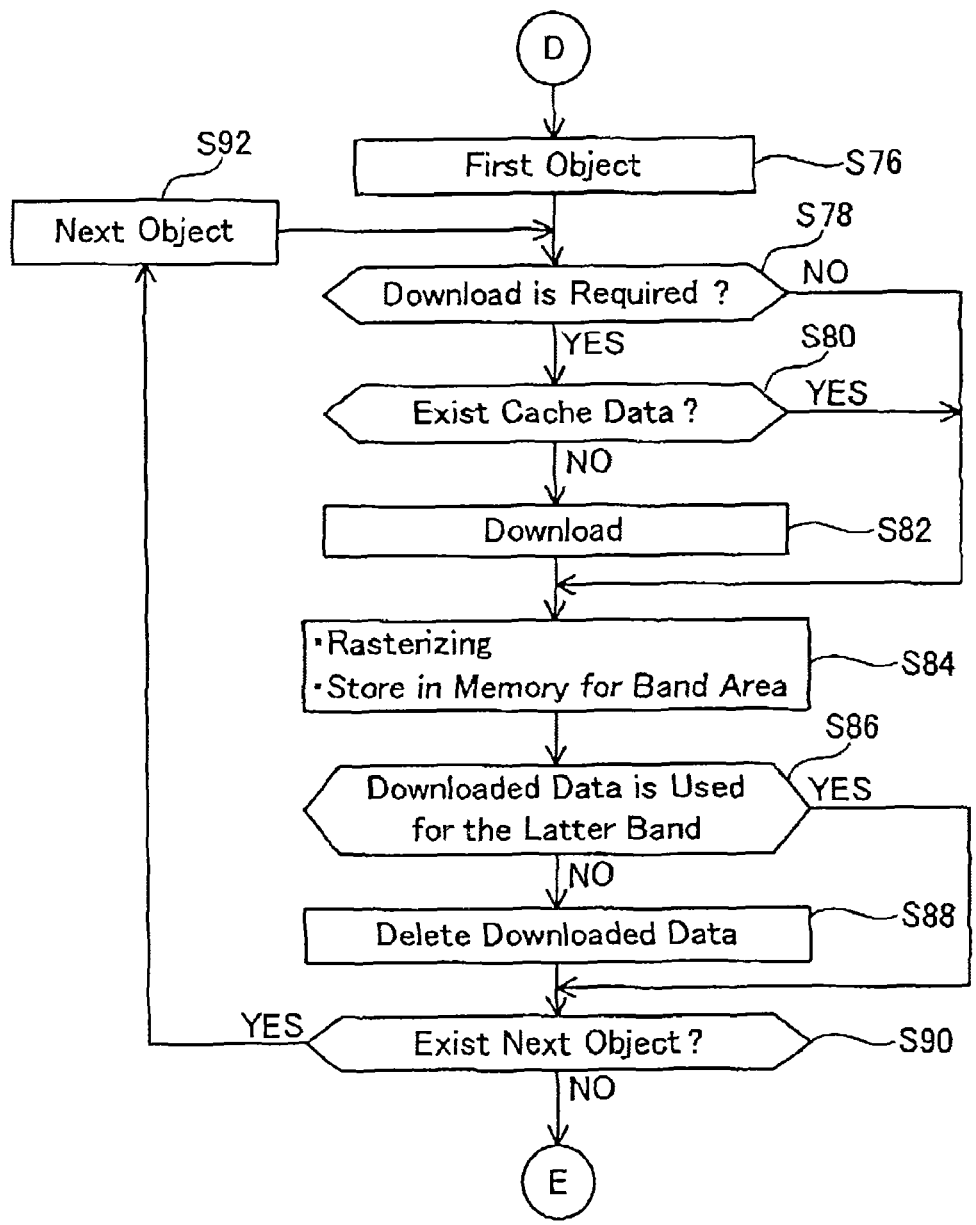
FIG. 11 shows a flowchart of a process executed by the printer (continuation of FIG. 10).

In the present embodiment, the process that the printer 50 will execute is different than in the first embodiment. FIGS. 9 to 11 show a flowchart of a process executed by the printer 50 of the present embodiment. S50 and S52 are the same processes as S50 and S12 of FIG. 3. Because of this, an explanation of S50 and S52 will be omitted. The printer 50 will select one quadrangle object from each quadrangle object that was created in S52 (S54). Next, the printer 50 will determine whether or not the quadrangle object selected in S54 needs to be downloaded (S56). In other words, it will be determined whether or not the quadrangle object selected in S54 is a quadrangle image object. In a case where the answer is YES, the number of the band area in which that quadrangle image object is to be included will be calculated (S58). In this process, the coordinate y2 of the lower edge of the quadrangle image object will be divided by the band width hB. The value to the right of the decimal point will be discarded. For example, with the quadrangle image object 142 of FIG. 7, the coordinate y2 of the lower edge thereof is 120 (see FIG. 8). This 120 will be divided by the band width hB. That will result in a solution of "zero" being obtained. The solution "zero" will correspond to the number of the band area (n=0). In addition, for example, the quadrangle image object 144 of FIG. 7 will be included in both band 122 and band 124. In this case, the number of band 124 in which the lower edge of coordinate C4 (n=2) will be obtained in S58.

Next, the printer 50 will determine whether or not the Internet URL (i.e., the address of the download) at which the image data of the quadrangle image object that was determined to be YES in S56 has been registered in the position data storage area 64 (see FIG. 2) (S60). In a case where the answer is NO in S60, data in which the address of the image data, the page number, and the band area number will be associated with each other will be stored in the position data storage area 64 (S64). The address is included in the quadrangle image object. The layout data 140 of the present embodiment (see FIG. 8) includes data on the page number of the printing sheet (not shown in the drawings). Because of this, the printer 50 can specify the page number of the printing sheet on which the quadrangle image object determined to be YES in S56. The band area number was obtained in S58. For example, with the quadrangle image object 142 of FIG. 7, data in which the address, the page number "1", and the band area number "0" have been associated with each other will be stored in the position data storage area 64. FIG. 12 shows an example of content that is stored in the position data storage area 64. The situation in which S62 will be executed will be described later.

In S66, it will be determined whether or not a next object is present. In a case where the answer is YES, the printer 50 will select the next object (S68). The printer 50 will execute the processes S56 to S64 with respect to the object selected in S68. The printer 50 will execute the processes S56 to S64 with respect to each of all objects to be included in the layout data 140. There is a possibility that the printer 50 determines the answer to be YES in S60 in a case of two or more repetitions of the processes of S56 to S64 (the processes of S56 to S64 that are to be executed via S68). In other words, the printer 50 can determine the answer to be YES in S60 in a case where two or more of the same image objects are included in the layout data 140. In a case where the answer is YES in S60, the printer 50 will determine either that the quadrangle image object previously registered in the position data storage area 64, or the quadrangle image object selected in S68 (this is the same as the previously registered one), will be rasterized first. In a case where the former will be rasterized after the latter, it will be determined that the answer in S62 is YES. In this case, S64 will be skipped. In other words, the data on the quadrangle image object selected in S68 (the address, page number, and band area) is not stored in the position data storage area 64. On the other hand, in a case where the latter is rasterized after the former, it will be determined that the answer is NO in S62. In this case, the data on the quadrangle image object selected in S68 (the address, page number, and band area) is stored in the position data storage area 64 (S64). In this case, the data on the previously registered quadrangle image object will be deleted from the position data storage area 64. These processes can be rephrased as follows. In other words, in a case where two or more of the same image objects are included in the layout data 140, the data on the image object to be rasterized first will not be stored in the position data storage area 64, and the data on the image object to be rasterized thereafter will be stored in the position data storage area 64. The printer 50 is capable of doing a duplex printing (both side printing). In a case where the printer 50 prints on the front surface of the print medium, the print medium is transported from an upper end side to a lower end side of the print medium. In this case, when the printer 50 prints on the back surface of this print medium, the print medium is transported from the lower end side to the upper end side of the print medium. That is, as to the back surface, the rasterization is to be performed in the opposite direction of the rasterizing direction of the front surface The determination of S62 may be performed in view of such situation.

It will be determined that the answer is NO in S66 if the processes of S56 to S64 are performed with respect to all objects 142, 144, 146 included in the layout data 140. In this case, the process will proceed to S70 in FIG. 10. The processes of S70 to S102 of FIG. 10 and FIG. 11 are substantially the same as the processes of S14 to S46 of FIG. 3 and FIG. 4. Here, only the points that differ from the first embodiment will be described. The process of S86 of FIG. 11 differs from S30 of FIG. 4. In S86, it will be determined whether or not the object (quadrangle image object) selected in S76 or S92 is to be included in the band that will be later rasterized. This process will be performed by referring to the content stored in the position data storage area 64. For example, in a case where the process of S86 is to be performed with respect to the quadrangle image object 144 of band 122 (n=1) in FIG. 7, the printer 50 searches the address of the quadrangle image object 144 from the position data storage area 64. In this way, the page number and the band area associated with the address of the quadrangle image object 144 will be specified. Here, page "1" and band area "n=2" will be specified. The band 122 currently being processed is band area number "n=1" of page 1. Because of this, the printer 50 will determine that the quadrangle image object 144 will be used in a later band. In other words, the answer in S86 will be determined to be YES. In addition, for example, in a case where the process of S86 is to be performed with respect to the quadrangle image object 144 of band 124 (n=2) of FIG. 7, the printer 50 searches the address of the quadrangle image object 144 from the position data storage area 64. In this way, the page number "1" and the band area number "n=2" that are associated with) the address of the quadrangle image object 144 will be specified. The band 124 currently being processed 124 is the band area number "n=2" of page "1." Because of this, the printer 50 will determine that the quadrangle image object 144 will not be used in a later band. In other words, the printer 50 will determine that the answer in S86 is NO.

The present embodiment can determine whether or not an image object is to be included in a band to be rasterized later. In particular, in the present embodiment, even in a case where two or more of the same image objects are separately arranged in print data, the image data of the image object will only be downloaded once. The printer 50 of the present embodiment can efficiently create bit-mapped data in band units from print data included in a DL object.

Third Embodiment

Figure 13:
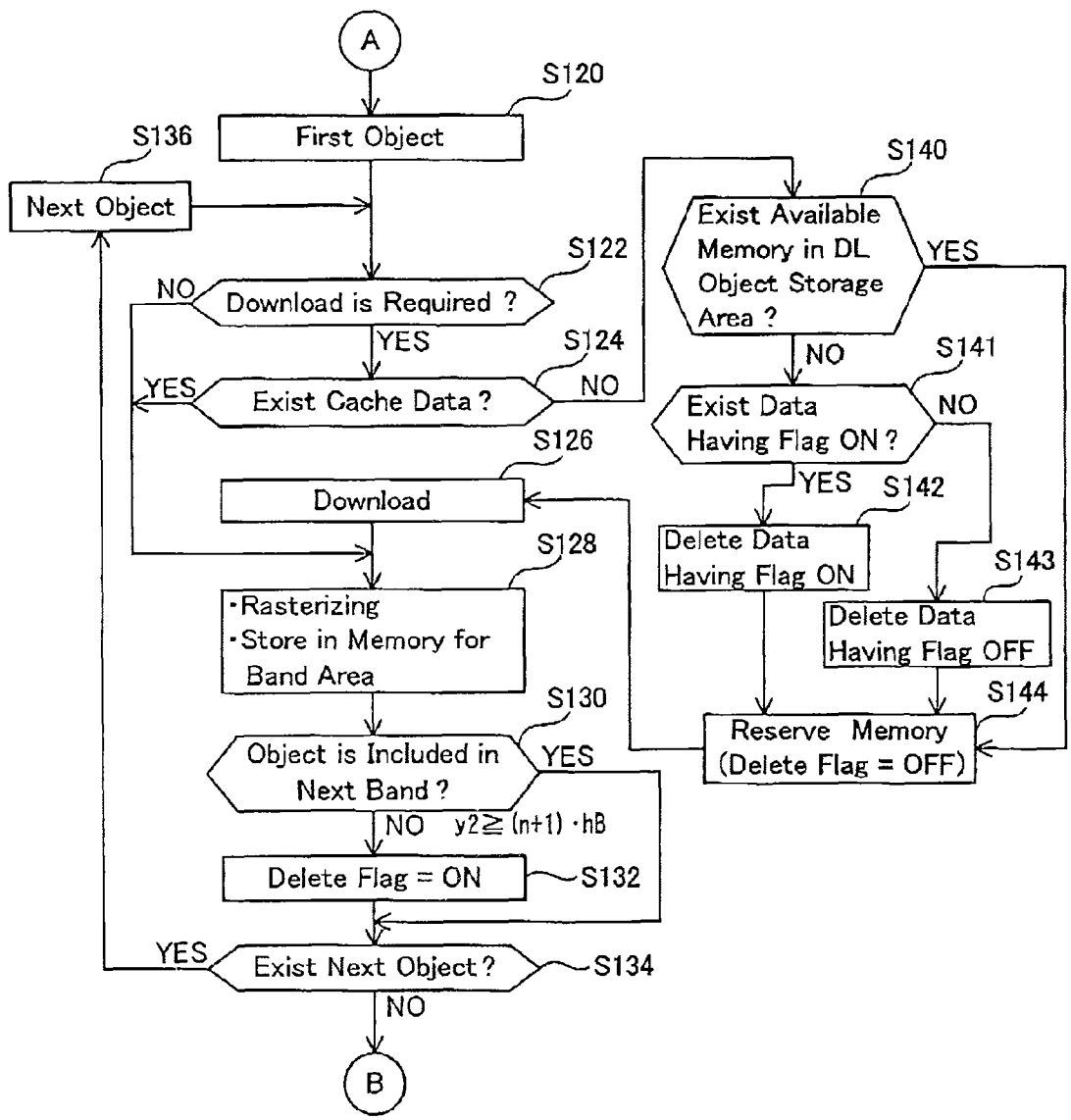
FIG. 13 shows a flowchart of a process executed by the printer (third embodiment).

In the present embodiment, the process that the printer 50 will execute is different than in the first embodiment. In the present embodiment, the processes that the printer 50 will perform differ from those of the first embodiment shown in FIG. 4. FIG. 13 shows a flowchart of the processes that the printer 50 of the present embodiment will perform (processes that will be substituted for those of FIG. 4 of the first embodiment). In the present embodiment, a delete flag will be associated with each DL object stored in the DL object storage area 56. The delete flag will have either an ON value or OFF value.

S120 to S124 of FIG. 13 are the same as S20 to S24 of FIG. 4. In a case where the answer is NO in S124, it will be determined whether or not there is a predetermined quantity of free space or greater in the DL object storage area 56 (S140). In a case where the answer is YES here, the printer 50 will skip S141 to S143 and proceed to S144. In a case where the answer is NO here, it will be determined whether or not data having the delete flag ON exists in the DL object storage area 56 (S141). In a case where the answer is YES here, the data having the delete flag ON will be deleted from the DL object storage area 56 (S142). On the other hand, in a case where the answer in S141 is NO, the data having the delete flag OFF will be deleted from the DL object storage 56 (S 143). The process will proceed to S144 when S142 or S143 is completed. In S144, the free memory in the DL object storage area 56 will be secured. The delete flag OFF will be associated with this free memory. The process will proceed to S126 when S144 is completed.

A DL object will be downloaded in S126. This DL object will be stored in the free memory (DL object storage area 56) that was secured in S144. In a case where the answer is NO in S130, the printer 50 will change the delete flag of the DL object rasterized in S128 from OFF to ON (S132). S134 and S136 are the same as S34 and S36 of FIG. 4.

In the present embodiment, even if the DL object is not to be included in the next band, that DL object may not be immediately deleted. The DL object will be deleted in accordance with the free space in the DL object storage area 56. Even with this type of construction, bit-mapped data can be efficiently created in band units from print data that includes DL objects.

Fourth Embodiment

Figure 14:
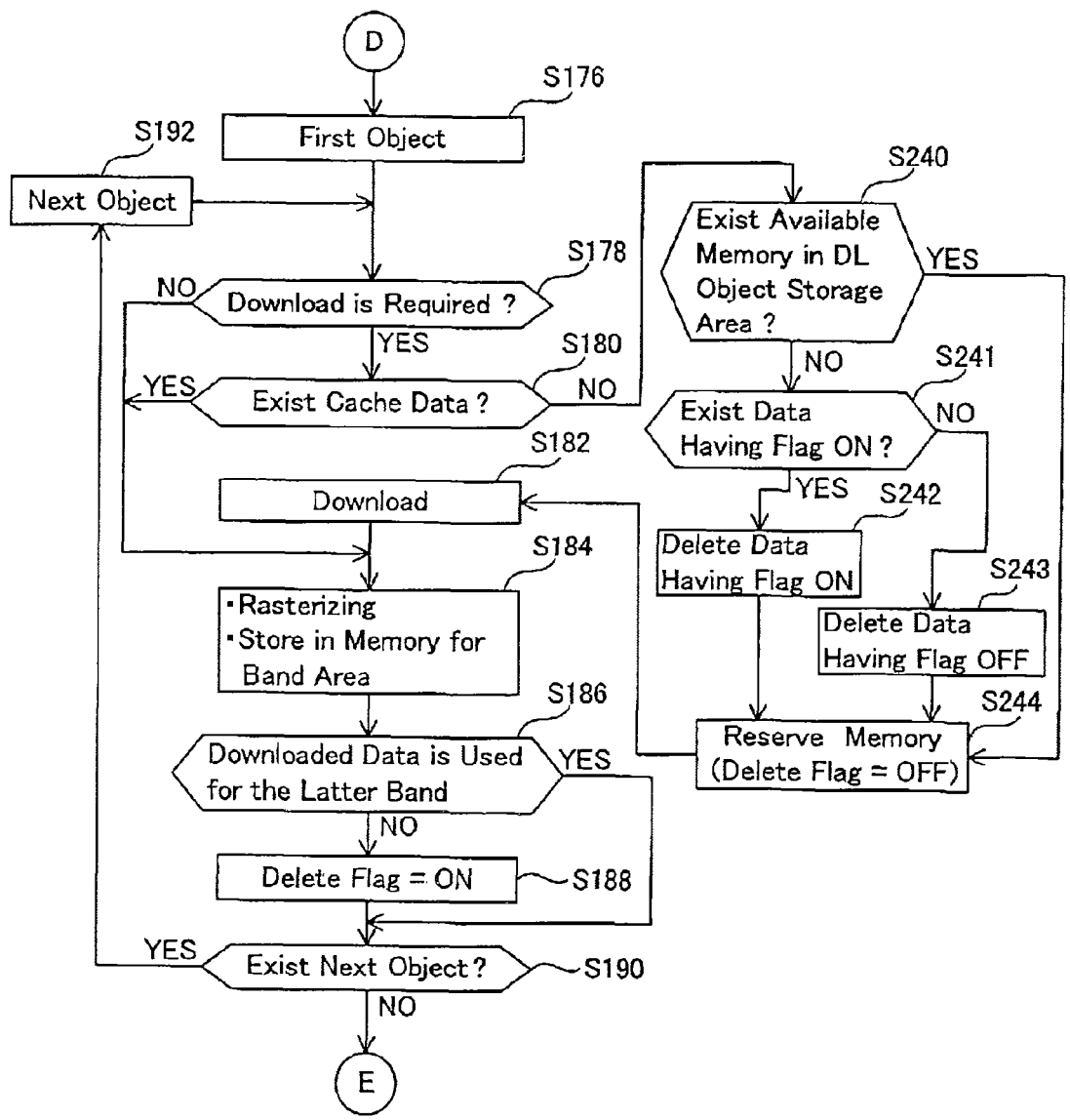
FIG. 14 shows a flowchart of a process executed by the printer (fourth embodiment).

In the present embodiment, the process that the printer 50 will execute is different than in the second embodiment. In particular, the printer 50 will perform the processes shown in FIG. 11 that differ from those of the second embodiment. FIG. 14 shows a flowchart of the processes that the printer 50 of the present embodiment will perform (processes that will be substituted for those of FIG. 11 of the second embodiment). In the present embodiment, a delete flag will be associated with each DL object stored in the DL object storage area 56. The delete flag will have either an ON value or an OFF value.

S176 to S180 of FIG. 14 are the same as S76 to S80 of FIG. 11. In a case where the answer is NO in S180, the process will proceed to S240. S240 to S244 are the same as S140 to S144 of FIG. 13. The process will proceed to S182 when S244 is completed. A DL object will be downloaded in S182. This DL object will be stored in the free memory (DL object storage area 56) that was secured in S244. S184 and S186 that will be performed next are the same as S84 and S86 of FIG. 11. In a case where the answer is NO in S186, the printer 50 will change the delete flag of the DL object rasterized in S184 from OFF to ON (S188). S190 and S192 are the same as S90 and S92 of FIG. 11.

In the present embodiment, like in the third embodiment, the DL object will be deleted in accordance with the free space in the DL object storage area 56. Even with this type of construction, bit-mapped data can be efficiently created in band units from print data that includes DL objects.

Fifth Embodiment

Figure 15:
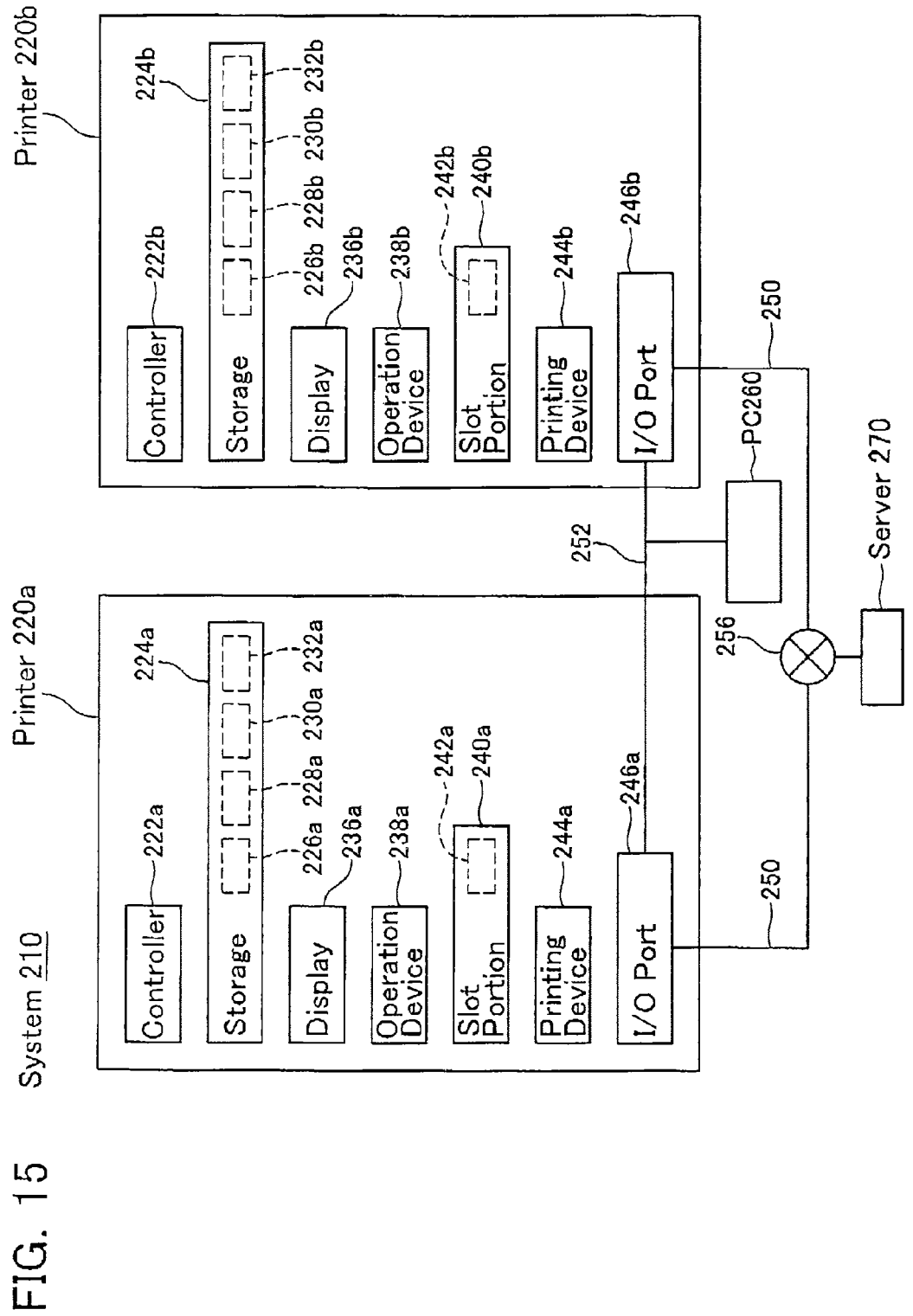
FIG. 15 shows the structure of a printer system (fifth embodiment).

FIG. 15 shows a printer system 210 of the present embodiment. The printer system 210 has a first printer 220a, a second printer 220b, a PC 260, a server 270, etc. Each printer 220a, 220b is connected to Internet 256.
(Construction of the First Printer)
The first printer 220a has a controller 222a; a storage 224a, a display 236a, an operation device 238a, a slot portion 240a, a printing device 244a, and an I/O port 246a. The controller 222a includes a CPU etc. The controller 222a will comprehensively control each process that the first printer 220a will execute. For example, the controller 222a can execute a process that will rasterize print data and create bit-mapped data. The controller 222a will function as a rasterizer. The storage 224a includes ROM, RAM, EEPROM, etc. The storage 224a stores programs that allow the controller 222a to perform each process. In addition, the storage 224a can store various types of data produced in the steps executed by the aforementioned programs. The storage 224a has storage areas 226a, 228a, 230a, 232a. The content of the data stored in each storage area 226a to 232a wall be described below.

The print data storage area 226a can store print data. In addition, the print data storage area 226a can store layout data that was converted from the print data. The content of the print data and the layout data will be described later. The DL object storage area 228a can store DL objects (image data) that were downloaded from the Internet 256. The first bit-mapped data storage area 230a can store at least one band of bit-mapped data. The second bit-mapped data storage area 232a can also store at least one band of bit-mapped data.

The display 236a is a liquid crystal display, etc. The display 236a can display various types of data. The operation device 238a includes a plurality of keys. A user can input various types of data into the printer 220a by operating the operation device 238a. The slot portion 240a can receive various types of memory cards 242a. The printing device 244a is an inkjet type or laser type of printing device. The printing device 244a can print on printing sheets not shown in the drawings. An internet line 250 and a LAN line 252 are connected to the I/O port 246a. The internet line 250 is connected to the Internet 256. The first printer 220a is capable of communicating with various devices 270 etc. via the Internet 256. The LAN line 252 is connected to a PC 260. The first printer 220a can communicate with the PC 260. In addition, the LAN line 252 is connected to the second printer 220b. The first printer 220a can communicate with the second printer 220b.

(Construction of the Second Printer)

The second printer 220b has the same construction as the first printer 220a. In other words, the second printer 220b has a controller 222b, a storage 224b, a display 236b, an operation device 238b, a slot portion 240b, a printing device 244b, and an I/O port 246b. The controller 222b will function as a rasterizer. The storage device 224b has a print data storage area 226b, a DL object storage area 228b, a first bit-mapped data storage area 230b, and a second bit-mapped data storage area 232b. The content of the data that these storage areas 226b to 232b store is the same as that of the first printer 220a. In addition, the slot portion 240b can receive various types of memory cards 242b.

A user can command the first printer 220a to print the content displayed on the PC 260 by operating the PC 260. In this case, the print data will be sent to the first printer 220a from the PC 260. The first printer 220a will print based upon the print data sent from the PC 260. Likewise, a user can command the second printer 220b to print the content displayed on the PC 260. In this case, print data will be sent from the PC 260 to the second printer 220b, and that print data will be printed by the second printer 220b. In addition, a user can command the first printer 220a to print the data stored in the memory card 242a by operating the operation device 238a. In this case, the first printer 220a will receive the print data stored in the memory card 242a, and print based upon that print data. Likewise, a user can command the second printer 220b to print the content stored in the memory card 242b. In this case, the second printer 220b will receive the print data stored in the memory card 242b, and print based upon that print data.

(Processes Executed by the Printer)

Figure 16:
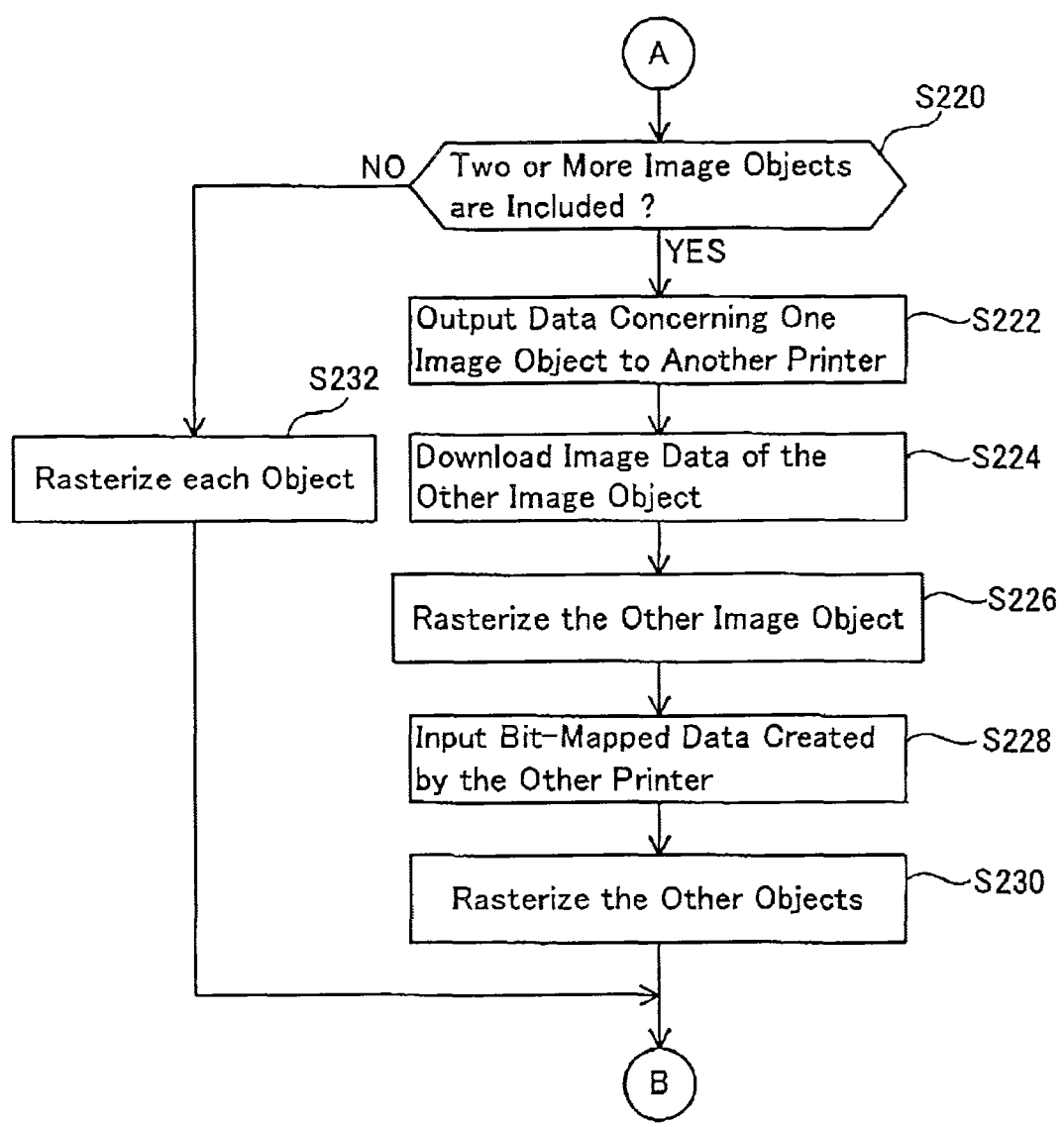
FIG. 16 shows a flowchart of a process executed by the printer.

The printing process executed by the first printer 220a will be described. Here, the printing process executed by the first printer 220a will be described. This printing process will be executed in a case where print data has been sent from the PC 260, or a case where the printer has been commanded to print the print data stored in the memory card 242a. This printing process will be executed by the controller 222a. A case in which print data stored in the memory card 242a is to be printed will be described below as an example. The processes to be executed in the present embodiment differ from the first embodiment. In particular, the first printer 220a will perform processes that differ from the processes shown in FIG. 4 of the first embodiment. FIG. 16 shows a flowchart of the processes that the printer 220a of the present embodiment will perform (processes that will be substituted for those of FIG. 4 of the first embodiment).

Figure 17:
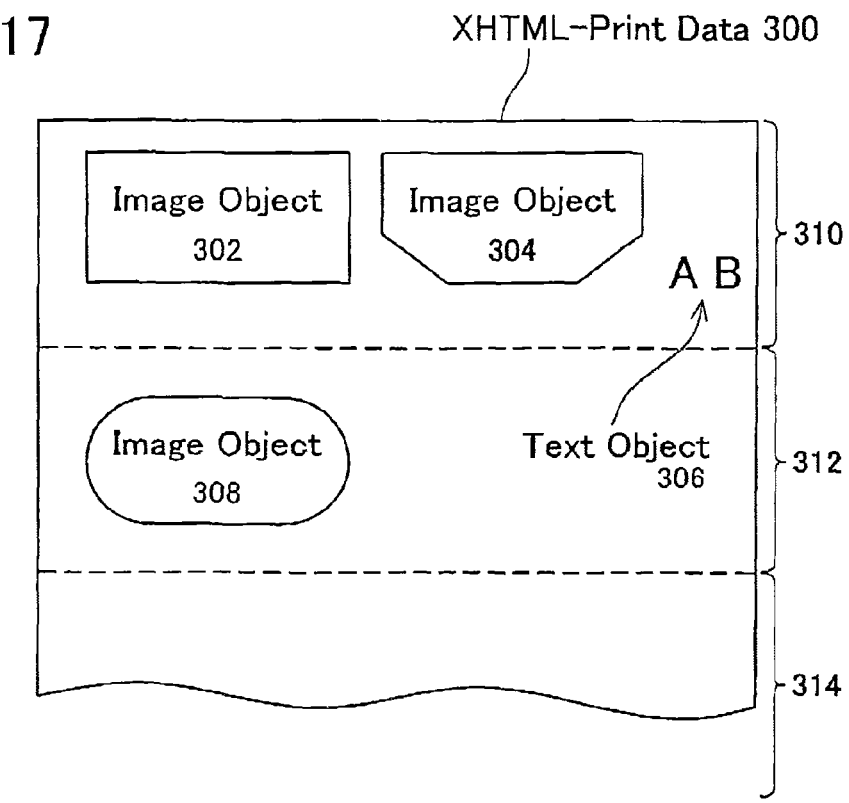
FIG. 17 shows a visual representation of print data.

FIG. 17 shows a visual representation of the print data stored in the memory card 242a. The print data 300 is XHTML-Print data. In order to print the XHTML-Print data 300, it will be necessary to rasterize the data 300 to create bit-map format data. The print data 300 of FIG. 17 includes four objects 302, 304, 306, 308. The objects 302, 304, 308 are image objects. The object 302 is a JPEG format image object. The objects 304, 308 are SVG format image objects. The image data of the image objects 302, 304, 308 is not included in the print data 300. The image data of each image object 302, 304, 308 is stored in another device on the Internet 256. The print data 300 includes the Internet address at which the image data of each image object 302, 304, 308 is stored. If the address at which the print data 300 is included is accessed, the image data of each image object 302, 304, 308 will be downloaded from the Internet 256. Each image object 302, 304, 308 is an object that should be downloaded from the Internet 256, and will be hereinafter referred to as a "DL object". Note that in the present embodiment, the image data of each image object 302, 304, 308 is stored in the server 270 shown in FIG. 15.

The object 306 of FIG. 17 is a text object. The first printer 220a can create bit-mapped data from the text object 306, and print the text (AB) of the text object 306 on print media. In other words, the text object 306 need not be downloaded from the Internet 256. In other words, the text object 306 can be referred to as a non-DL object.

Figure 18:
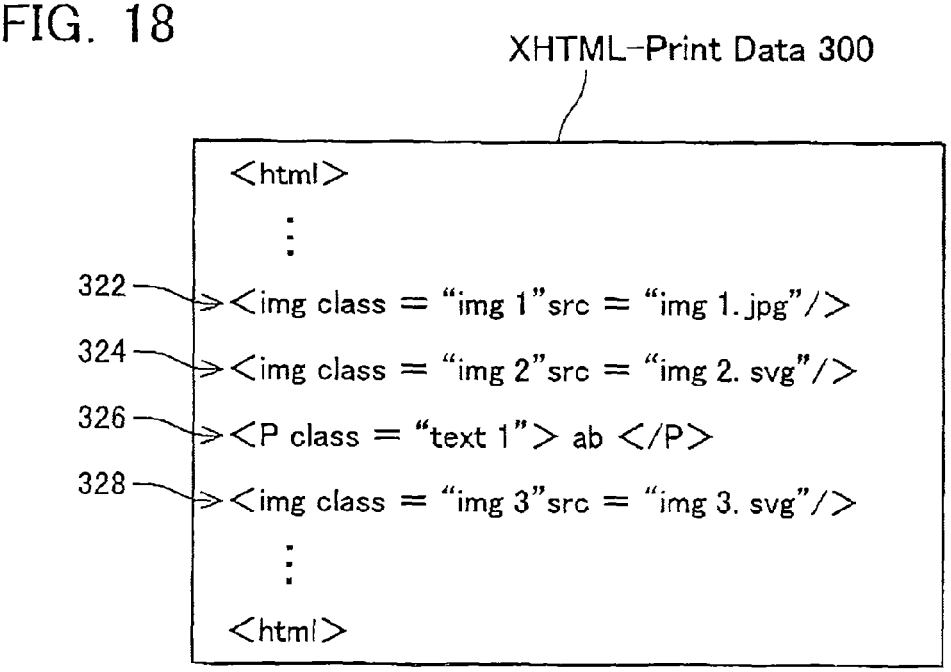
FIG. 18 shows the data structure of the print data.

FIG. 18 shows the data structure of the XHTML-Print data 300 of FIG. 17. The print data 300 of FIG. 18 includes data 322 corresponding to the image object 302, data 324 corresponding to the image object 304, data 326 corresponding to the text object 306, and data 328 corresponding to the image object 308. The data 322 indicates that it is JPEG format image data (img1.jpg). In addition, the data 322 includes the Internet address at which the image data is stored (not shown in FIG. 18). In other words, the data 322 includes the address FURL) of the server 270 (see FIG. 15). The data 324 indicates that it is SVG (Scalable Vector Graphics) format image data (img2.svg). The data 324 includes the Internet address at which the image data is stored (the address of the server 270). The data 326 includes the word "AB" as text data. The data 328 indicates that it is SVG format image data (img3.jpg). The data 328 includes the Internet address at which the image data is stored (the address of the server 270).

Figure 19:
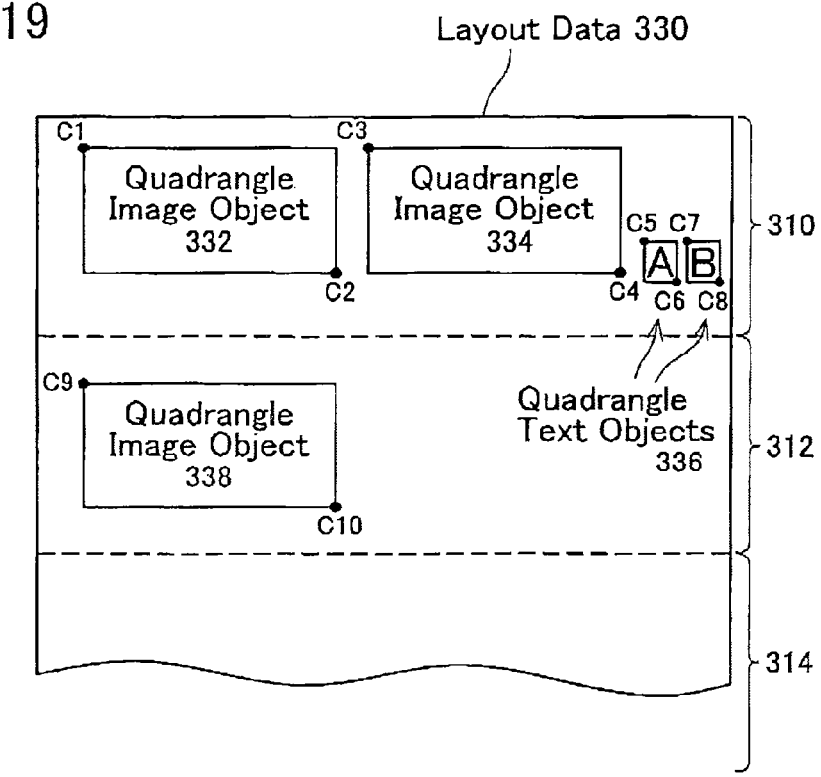
FIG. 19 shows a visual representation of layout data.
Figure 20:
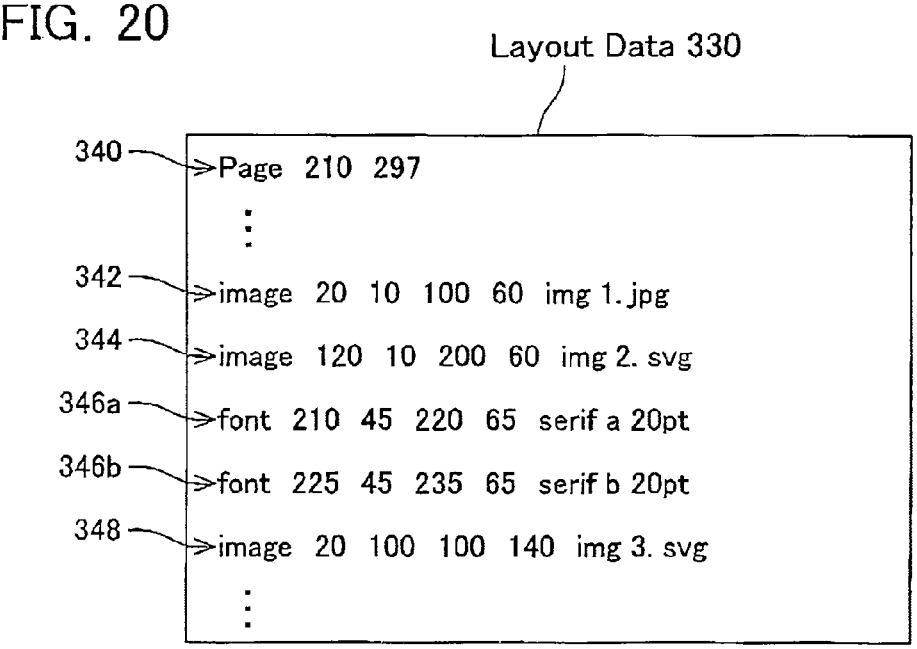
FIG. 20 shows the data structure of layout data.

The first printer 220a will perform the layout process in the same way as in the first embodiment (see S12 of FIG. 3). In the layout process, each object 302, 304, 306, 308 included in the XHTML-Print data 300 will be converted to a quadrangle object. FIG. 19 shows a visual representation of data 330 (layout data 330) after the print data 300 of FIG. 17 has been converted by the layout process. FIG. 20 shows the data structure of the layout data 330 of FIG. 19.

The image object 302 of FIG. 17 will be converted to a quadrangle image object 332 of FIG. 19. The quadrangle image object 332 is positioned by two coordinates C1, C2 of a quadrangle that approximately circumscribes the image object 302. Because the image object 302 is itself a quadrangle, the quadrangle image object 332 has the same quadrangle as the image object 302. The coordinate C1 and the coordinate C2 are two coordinates that are positioned on one diagonal line of the quadrangle (hereinafter referred to as diagonal coordinates). The data 342 of FIG. 20 corresponds to the quadrangle image object 332 of FIG. 19. "20 10" of data 342 corresponds to the coordinate C1. "100 60" of data 342 corresponds to the coordinate C2.

The image object 304 of FIG. 17 will be converted to a quadrangle image object 334 of FIG. 19. The quadrangle image object 334 is positioned by diagonal coordinates C3, C4 of a quadrangle that approximately circumscribes the image object 304. The data 344 of FIG. 20 corresponds to the quadrangle image object 334 of FIG. 19. "120 10" of data 344 corresponds to the coordinate C3. "200 60" of data 344 corresponds to the coordinate C4.

The text object 306 of FIG. 17 will be converted to the quadrangle text object group 336 of FIG. 19. The text object 306 is the 2 letters of the word "AB". In this case, each of the two letters will be converted to a quadrangle text object 336. For example, the quadrangle text object 336 of the letter "A" is positioned by the diagonal coordinates C5, C6 of the quadrangle that approximately circumscribes the "A." The data 346a of FIG. 20 corresponds to the quadrangle text object 336 of the letter "A" of FIG. 19. "210 45" of data 346a corresponds to the coordinate C5. "220 65" of data 346a corresponds to the coordinate C6. In addition, "serif a 20 pt" of data 346a means that the letter "A" is in 20 point font. Likewise, the other letter "E" will be converted to the quadrangle text object 336. In FIG. 20, data 346b that corresponds to the letter "B" is shown. "225 45" of data 346b corresponds to the coordinate C7. "235 65" of data 346b corresponds to the coordinate C8. "serif b 20 pt" of data 346b means that the letter "B" is in 20 point font.

The image object 308 of FIG. 17 will be converted to a quadrangle image object 338 of FIG. 19. The quadrangle image object 338 is positioned by diagonal coordinates C9, C10 of a quadrangle that approximately circumscribes the approximately oval shaped image object 308. The data 348 of FIG. 20 corresponds to the quadrangle image object 338 of FIG. 19. "20,100" of data 348 corresponds to the coordinate C9. "100,140" of data 348 corresponds to the coordinate C10. Note that the data 340 of FIG. 20 shows the dimensions of the printing sheet (vertical 210, horizontal 297).

When the layout process (S12) of FIG. 3 is complete, S16 and S18 will be performed in the same way as the first embodiment. In S18, the objects in which y1 or y2 are to be included between n×hB and (n+1)×hB will be specified. For example, with band 310 (see FIG. 19), the objects in which y1 or y2 are to be included between zero and hB will be specified. In the present embodiment, the two quadrangle image objects 332, 334 and the two quadrangle text objects 336, 336, will be specified.

The process will proceed to S220 of FIG. 16 when the first printer 220a completes S18 of FIG. 3. In S220, it will be determined whether or not two or more quadrangle image objects have been specified in S18. For example, with band 310, it will be determined that the answer is YES in S220 because two quadrangle image objects 332, 334 will be specified in S18. In a case where the answer is YES in S220, the first printer 220a will output data relating to one quadrangle image object (here, the quadrangle image object 332)(S222). In other words, the address at which the image data of the quadrangle image object 332 is stored, the magnification ratio (or reduction ratio) of that image data, the rotation angle of that image data, the print resolution, etc. will be output to the second printer 220b.

The second printer 220b will input the data of the quadrangle image object 332 (address, magnification ratio, rotation angle, resolution, etc.) that was output from the first printer 220a. The second printer 220b will access the address that was input (i.e., the server 270 of FIG. 15), and download the image data of the quadrangle image object 332. The image data that was downloaded will be stored in the DL object storage area 228b (see FIG. 15). The second printer 220b will rasterize the downloaded image data based upon the data output from the first printer 220a (magnification ratio, rotation angle, resolution, etc.). In other words, the size of the dots (there may be no dots) and the color to be printed in each coordinate inside the area in which the quadrangle image object 332 is to occupy will be determined. The density of the coordinates will depend upon the resolution of the printing. Various well-known methods can be used to perform rasterization. For example, a half tone process, dither method, etc. can be used to perform rasterization. The second printer 220b will output post-rasterization data (i.e., bit-mapped data of the quadrangle image object 332) to the first printer 220a. The bit-mapped data that was output from the second printer 220b will be input to the first printer 220a in S228 noted below.

When the first printer 220a outputs data relating to the quadrangle image object 332 in S222, the image data of the quadrangle image object 334 will be downloaded (S224). This process will be performed by accessing the address at which the quadrangle image object 334 is included (the address of the server 270). The image data that was downloaded will be stored in the DL object storage area 228a (see FIG. 15). The first printer 220a will rasterize the downloaded image data (S226). Various well-known methods can be used to perform this rasterization as well. The bit-mapped data of the quadrangle image object 334 that was obtained by means of rasterization is stored in the first bit-mapped data storage area 230a (see FIG. 15).

Note that the bit-mapped data for the band 312 that is to be rasterized after the band 310 is stored in the second bit-mapped data storage area 232a (see FIG. 15). In addition, the bit-mapped data of the band 314 will be stored in the first bit-mapped storage area 230a. In this case, the bit-mapped data of the band 310 will be deleted from the first bit-mapped storage area 230a. In addition, the bit-mapped data of the band following the band 314 (not shown in the drawings) will be stored in the second bit-mapped storage area 232a. In this case, the bit-mapped data of the band 312 will be deleted from the second bit-mapped storage area 232a. The bit-mapped data of each band 310, 312, 314, etc. will be alternately stored in the first bit-mapped storage area 230a and the second bit-mapped data storage area 232a.

The second printer 220b will create bit-mapped data for the quadrangle image object 332 while the first printer 220a creates bit-mapped data for the quadrangle image object 334. In other words, the first printer 220a and the second printer 220b will perform rasterization in parallel. The bit-mapped data for the quadrangle image object 332 output from the second printer 220b will be input to the first printer 220a in S228. The first printer 220a will rasterize the other objects 336, 336 included in band 310, and will store the bit-mapped data thereof in the first bit-mapped data storage area 230a. In this way, the bit-mapped data of all objects 332, 334, 336 included in band 310 will be stored in the first bit-mapped data storage area 230a.

Note that in the flowchart of FIG. 16, it seems as though the process of S228 will be executed after the process of S226 has been completed. However, the first printer 220a may execute the process of S228 prior to executing the process of S226 (or prior to completing the process). In addition, it seems like the process of S230 will be performed after the process of S229 has been completed. However, the first printer 220a may execute the process of S230 prior to executing the process of S228 (or prior to completing the process). The first printer 220a may execute the process of S230 prior to the execution of any of S220 to S228. However, the process of S230 is preferably executed after the process of S222 because the second printer 220b will quickly execute the process that rasterizes the quadrangle image object 332. In addition, in a case where three or more quadrangle image objects are included in one band, the first printer 220a may perform rasterization for a plurality of quadrangle image objects, and the second printer 220b may perform rasterization for one quadrangle image object. In addition, the first printer 220a may perform rasterization for one quadrangle image object, and the second printer 220b may perform rasterization for a plurality of quadrangle image objects. Note that in a case where four or more quadrangle image objects are included in one band, the first printer 220a may perform rasterization for a plurality of quadrangle image objects, and the second printer 220b may also perform rasterization for a plurality of quadrangle image objects.

The determination of S220 will be performed based upon the number of quadrangle image objects included in one band. In a case where the number of quadrangle image objects included in a band is 0 or 1, it will be determined that the answer in S220 is NO. In this case, the first printer 220a will not cause the rasterization of the image data by the second printer 220b. The first printer 220a will rasterize each object itself (S232). For example, in a case where one quadrangle image object is included in a band, the first printer 220a will download the image data of that quadrangle image object, and rasterize the downloaded image data. The process will proceed to S38 of FIG. 3 when the processes of S230 or S232 are complete. The process of S38 is the same as in the first embodiment.

The processes that the first printer 220a will execute have been described in detail. The second printer 220b can execute the process that will print the print data in accordance with the same flowchart as the first printer 220a (FIG. 3 and FIG. 16). For example, the second printer 220b can create layout data from the print data. In addition, in a case where two or more quadrangle image objects are included in one band, the second printer 220b will cause rasterization of the quadrangle image object to be performed by the first printer 220a.

In the present embodiment, the first printer 220a and the second printer 220b can jointly rasterize the print data 300. Tn other words, the process in which the first printer 220a will rasterize a portion of the print data 300, and the process in which the second printer 220b will rasterize the other portion of the print data 300, will be performed in parallel (simultaneously). In this case, the print data 300 can be rasterized more quickly than in a case where the print data 300 is rasterized by only one printer. The printer system 210 of the present embodiment will achieve high speed rasterization of the print data 300. As a result, the amount of time needed to print the print data 300 can be reduced. In addition, in the present embodiment, each object 302 to 308 to be included in the print data 300 will be converted into quadrangle objects 332 to 338. Each object will be positioned by means of the coordinates of a simple quadrangle. Because of this, the first printer 220a (or the second printer 220b) can easily determine an object to be included inside a band.

Sixth Embodiment

Figure 21:
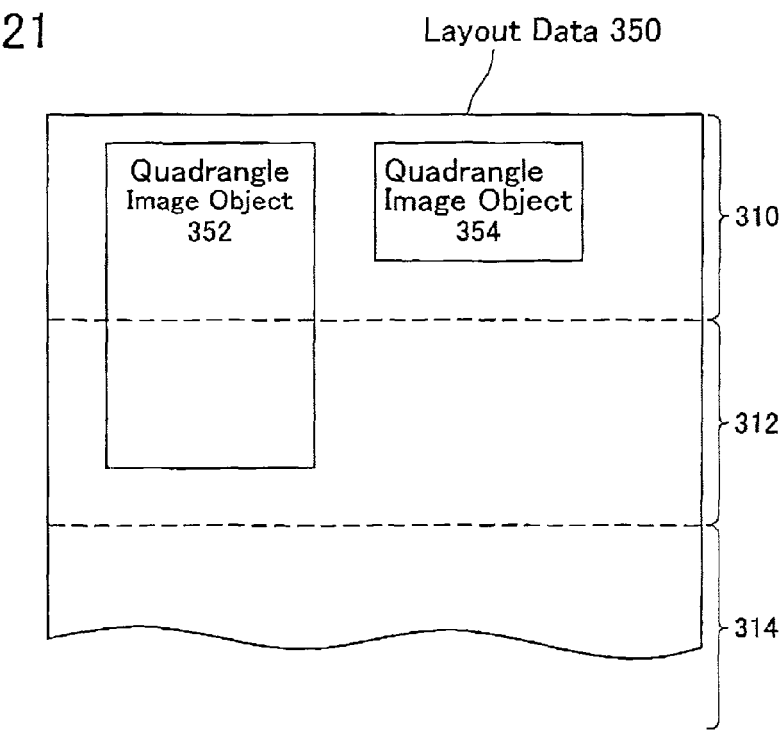
FIG. 21 shows another example of the layout data.

In the present embodiment, the processes that the first printer 220a (or the second printer 220b) will perform differ from those of the fifth embodiment. FIG. 21 shows an example of layout data. The processes that the first printer 220a of the present embodiment will perform will be described with reference to FIG. 21. The layout data 350 includes two quadrangle image objects 352, 354. The quadrangle image objects 352 are arranged across two bands 310, 312. The quadrangle image object 354 is only included in the band 310.

The first printer 220a will command the second printer 220b to rasterize the quadrangle image object 354. In other words, the first printer 220a will output the data related to the quadrangle image object 354 (address, magnification ratio, rotation angle, resolution, etc.) to the second printer 220b. The second printer 220b will download image data of the quadrangle image object 354, and rasterize that image data. The first printer 220a will download image data of the quadrangle image object 352 from the Internet 256, and rasterize that image data. The first printer 220a will store this data (i.e., bit-mapped data) in the DL object storage area 228a after the quadrangle image object 352 was rasterized. The first printer 220a will cut only the portion of the bit-mapped data of the quadrangle image object 352 to be included in band 310, and that portion will be stored in the first bit-mapped data storage area 230a. In addition, the first printer 220a will input the bit-mapped data of the quadrangle image object 354 that was rasterized in the second printer 220b, and will store the input bit-mapped data in the first bit-mapped data storage area 230a. In this way, the bit-mapped data of the band 310 will be created.

The first printer 220a will create the bit-mapped data for band 312 while executing the process of printing on print media based upon the bit-mapped data for band 310 (S39 of FIG. 3). The bit-mapped data for the quadrangle image object 352 will be stored in the DL object storage area 228a. This bit-mapped data was obtained by rasterizing the quadrangle image object 352 when the bit-mapped data for the band 310 is to be created. The first printer 220a will cut only the portion of the bit-mapped data of the quadrangle image object 352 to be included in band 312, and that portion will be stored in the second bit-mapped data storage area 332a. In this way, the bit-mapped data of the band 312 will be created.

Seventh Embodiment

In contrast to the sixth embodiment, the first printer 220a will download image data of the quadrangle image object 354 from the Internet 256, and rasterize that image data. The first printer 220a will command the second printer 220b to rasterize the quadrangle image object 352. In other words, the first printer 220a will output the data related to the quadrangle image object 352 (address, magnification ratio, rotation angle, resolution, etc.) to the second printer 220b. The second printer 220b will download image data of the quadrangle image object 352, and rasterize that image data. The second printer 220b will store this data (i.e., bit-mapped data) in the DL object storage area 228b after the quadrangle image object 352 was rasterized. The second printer 220b will cut only the portion of the bit-mapped data of the quadrangle image object 352 to be included in band 310, and that portion will be output to the first printer 220a. The first printer 220a will input the bit-mapped data of the quadrangle image object 352 that was output from the second printer 220b (only the portion that is to be included in the band 310), and will store the input bit-mapped data in the first bit-mapped data storage area 230a. In addition, the first printer 220a will store the bit-mapped data of the quadrangle image object 354 in the first bit-mapped data storage area 230a. In this way, the bit-mapped data of the band 310 will be created.

The first printer 220a will create the bit-mapped data for band 312 while executing the process of printing on print media based upon the bit-mapped data for band 310 (S38 of FIG. 3). The bit-mapped data for the quadrangle image object 352 will be stored in the DL object storage area 228b of the second printer 220b. The first printer 220a will command the second printer 220b to output the bit-mapped data of the quadrangle image object 352 (only the portion that is to be included in band 312). The second printer 220b will cut only the portion of the bit-mapped data of the quadrangle image object 352 to be included in band 312, and that portion will be output to the first printer 220a. The first printer 220a will input the bit-mapped data of the quadrangle image object 352 that was output from the second printer 220b (only the portion that is to be included in band 312), and will store the input bit-mapped data in the second bit-mapped data storage area 232a. In this way, the bit-mapped data of the band 312 will be created.

Eighth Embodiment

Figure 22:
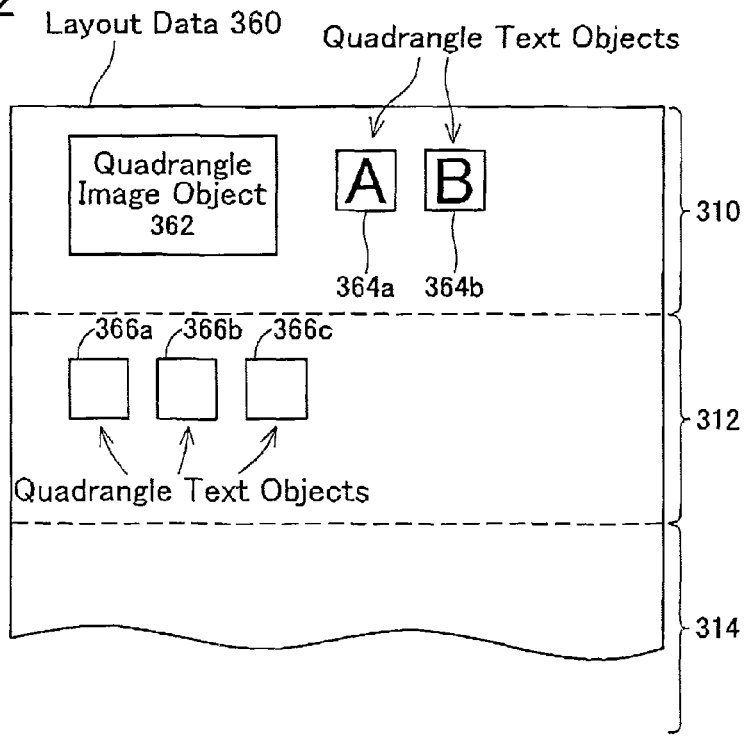
FIG. 22 shows another example of layout data.

In the present embodiment, the processes that the first printer 220a (or the second printer 220b) will perform differ from those of the fifth embodiment. In particular, the standard for the determination of S220 of FIG. 16 differs from that of the first embodiment. FIG. 22 shows an example of layout data. The processes that the first printer 220a of the present embodiment will perform will be described with reference to FIG. 22. In a case where two or more quadrangle image objects are included in one band, the first printer 220a of the fifth embodiment will command the second printer 220b to rasterize at least one quadrangle image object (S220, S222 of FIG. 16). In contrast to this, in a case where one of the quadrangle image objects is not included in one band, but another object (quadrangle text object) is included in that band, the first printer 220a of the present embodiment will command the second printer 220b to rasterize that quadrangle image object. For example, the band 310 of the layout data 360 of FIG. 22 includes one quadrangle image object 362 and two quadrangle text objects 364a, 364b. In this case, the first printer 220a will command the second printer 220b to rasterize the quadrangle image object 362. The first printer 220a will itself rasterize the quadrangle text objects 364a, 364b.

Note that the first printer 220a may command the second printer 220b to rasterize the quadrangle text objects 364a, 364b, and may itself rasterize the quadrangle image object 362.

Ninth Embodiment

In the present embodiment, the processes that the first printer 220a (or the second printer 220b) will perform differ from those of the fifth embodiment. In particular, the standard for the determination of S220 of FIG. 16 differs from that of the fifth embodiment. In a case where a plurality of objects are included in one band, the first printer 220a of the present embodiment will command the second printer 220b to rasterize at least one of the objects, regardless of the type of object. For example, the band 312 of FIG. 22 includes three quadrangle text objects 366a, 366b, 366c. In this case, the first printer 220a will command the second printer 220b to rasterize at least one quadrangle text object (e.g., 366a). The first printer 220a will itself rasterize the other quadrangle text objects (e.g., 366b, 366c).

Tenth Embodiment

Figure 23:
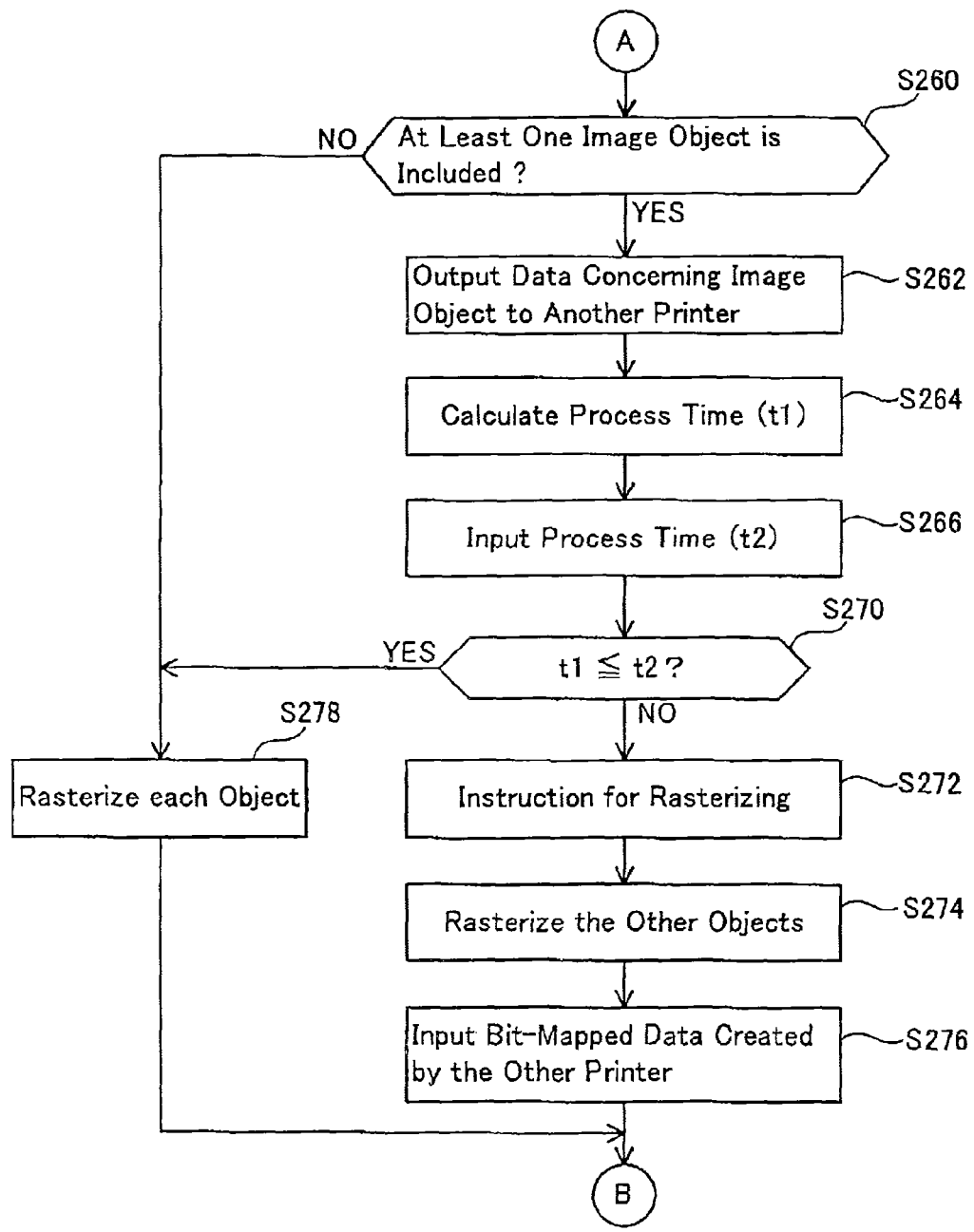
FIG. 23 shows a flowchart of a process executed by the printer (tenth embodiment).

In the present embodiment, the processes that the first printer 220a (or the second printer 220b) will perform differ from those of the fifth embodiment. In particular, the standard for the determination of S220 of FIG. 16 differs from that of the fifth embodiment. FIG. 23 shows a flowchart of the processes after S18 of FIG. 3. In other words, the first printer 220a of the present embodiment will execute the flowchart of FIG. 23 instead of the flowchart of FIG. 16. The first printer 220a will determine whether or not at least one quadrangle image object is included amongst the objects specified in S18 of FIG. 3 (S260). In a case where the answer here is YES, the first printer 220a will output data relating to one quadrangle image object (the address, magnification ratio, the rotation angle, the resolution, etc.) to the second printer 220b (S262).

When data relating to a quadrangle image object is input, the second printer 220b will rasterize that quadrangle image object and calculate a process time t2 in order to respond to the first printer 220a. The process time t2 is the sum of a time for downloading the image data of the quadrangle image object (tD), a time for rasterizing the downloaded image data (tL), and a time for sending the bit-mapped data obtained by the rasterization to the first printer 220a (i.e., transmission time; tT). The time tD may be a fixed value, and may be set based upon the quantity of image data or the like. When time tD is set, the processing speed of the second printer 220b may be taken into consideration. The time tL may be a fixed value, and may be set based upon the quantity of image data or the like. The time tT may be a fixed value, and may be set based upon items such as the quantity of image data, the communication speed between the first printer 220a and the second printer 220b, and the like. When the processing time t2 is calculated, the second printer 220b will output that processing time t2 to the first printer 220a. This process time t2 will be input to the first printer 220a in S266 described below.

The first printer 220a will calculate the time needed for process time t1 (S264). The process time t1 is the time where the first printer 220a will itself rasterize all objects included in a band (i.e., all objects specified in S18 of FIG. 3). The process time may be determined in response to the type of object. For example, the process time for quadrangle image objects (tIO) and the process tune for quadrangle text objects (tTO) may be set For example, in a case where two quadrangle image objects and three quadrangle text objects are included in one band, the process time t1 will be obtained by calculating the sum of 2×tIO and 3×tTO. On the other hand, the first printer 220a may calculate the process time t1 based upon the data quantity of an object or the like. In addition, the first printer 220a may take the download time for the image data of the quadrangle image object into consideration in order to calculate the process time t1.

The first printer 220a will input the process time t2 that was calculated by the second printer 220b (S266). The amount of time needed in a case where the first printer 220a and the second printer 220b will jointly rasterize a band (referred to here as joint process time) is the time needed by the first printer 220a to rasterize the band (t2' here) or the time needed by the second printer 220b to rasterize the band (the aforementioned t2). In other words, the joint process time will be t2' in a case where the time needed by the first printer 220a to rasterize the band is larger. In addition, the joint process time will be t2 in a case where the time needed by the second printer 220b to rasterize the band is larger. t1 is the time needed by the first printer 220a to rasterize all objects. t2' is the time needed by the first printer 220a to rasterize some of the objects (the objects other than the quadrangle image objects to be rasterized by the second printer 220b). Because of this, t2' is smaller than t1. In a case where t1 is smaller than t2, the rasterization of all objects by the first printer 220a can be performed more quickly. On the other hand, in a case where t2 is smaller than t1, joint rasterization by the first printer 220a and the second printer 220b can be performed more quickly. The joint process time in this case is t2 or t2', and this is because t2 is smaller than t1, and t2' is also smaller than t1.

The first printer 220a will compare the process time t1 calculated in S264 with the process time t2 that was input in S266 (S270). In a case where t1 is smaller than t2, it will be determined that the answer in S270 is YES. In a case where t2 is smaller than t1, it will be determined that the answer in S270 is NO. In a case where the answer in S270 is YES, the first printer 220a will itself rasterize all objects included in the band (S278). The first printer 220a will store the rasterized bit-mapped data in the bit-mapped data storage area 230a or 232a.

On the other hand, in a case where the answer is NO in S270, the first printer 220a will command the second printer 220b to rasterize the quadrangle image object (S272). The second printer 220b will rasterize the quadrangle image object, and output the bit-mapped data that was obtained by the rasterization to the first printer 220a. This bit-mapped data will be input to the first printer 220a in S276 noted below. Furthermore, the first printer 220a will rasterize the object(s) other than the quadrangle image objects that the second printer 220b was commanded to rasterize (S274). The first printer 220a will store the rasterized bit-mapped data in the bit-mapped data storage area 230a or 232a. The first printer 220a will input the bit-mapped data of the quadrangle image object created by the second printer 220b, and will store that bit-mapped data in the bit-mapped data storage area 230a or 232a (S276).

In the present embodiment, t1 will be compared to t2, and the faster tine will be used. t1 is not compared to t2', but it is understood that t2' is smaller than t1. Because of this, comparing t1 to t2 is equivalent to comparing the process time for rasterizing by the first printer 220a only to the process time for joint rasterization by the first printer 220a and the second printer 220b. According to the present embodiment, the time needed to rasterize print data can be reliably shortened.

Modifications to each of the aforementioned embodiments will be enumerated.

(Modification 1)

In the tenth embodiment, the second printer 220b may output the amount of memory that it can use to the first printer 220a in a case where the process of S262 of FIG. 23 has been performed by the first printer 220a. In this case, the first printer 220a may command the second printer 220b to rasterize only in a case where the amount of memory sent from the second printer 220b is larger than a predetermined threshold (i.e., the answer may be determined to be NO in S270 of FIG. 23).

(Modification 2)

In each of the aforementioned embodiments, there is a possibility that the commanding of the first printer 220a to print the print data, and the commanding of the second printer 220b to print other print data, are performed in parallel. In this case, the first printer 220a and the second printer 220b may be prevented from jointly printing the print data.

(Modification 3)

In each of the aforementioned embodiments, the bit-mapped data of the band unit need not be created from the print data. The first printer 220a (or the second printer 220b) may create bit-mapped data from all the print data, and then initiate printing. In this case, in each of the aforementioned embodiments, the process of S220 of FIG. 16 may be determined based upon the object(s) included in all print data, rather than being determined based upon an object included in a band.

(Modification 4)

The determination standard of S220 of each of the aforementioned embodiments can be combined by an AND condition and/or an OR condition.

(Modification 5)

The system 210 may also be constructed by three or more printers. In this case, three or more printers may jointly rasterize the print data.

Some of the characteristics of the technology disclosed in the above embodiments will be described. The rasterizer may execute the aforementioned process (3) as follows. The rasterizer may determine whether or not the predetermined DL object is to be included in the next band after the predetermined band. The rasterizer may delete the predetermined DL object from the first storage area in a case where the bit-mapped data of the predetermined DL object is created for the predetermined band and the predetermined DL object is not to be included in the next band. The predetermined DL object may not be deleted from the first storage area in a case where the predetermined DL object is to be included in the next band.

On the other hand, the rasterizer may execute the aforementioned process (3) as follows. The rasterizer may determine whether or not the predetermined DL object is to be included in any of bands after the predetermined band. The rasterizer may delete the predetermined DL object from the first storage area in a case where the bit-mapped data of the predetermined DL object for the predetermined band is created, and the predetermined DL object is not to be included in any of the bands. The predetermined DL object may not be deleted from the first storage area in a case where the predetermined DL object is to be included in any of the bands.

Figure 1:
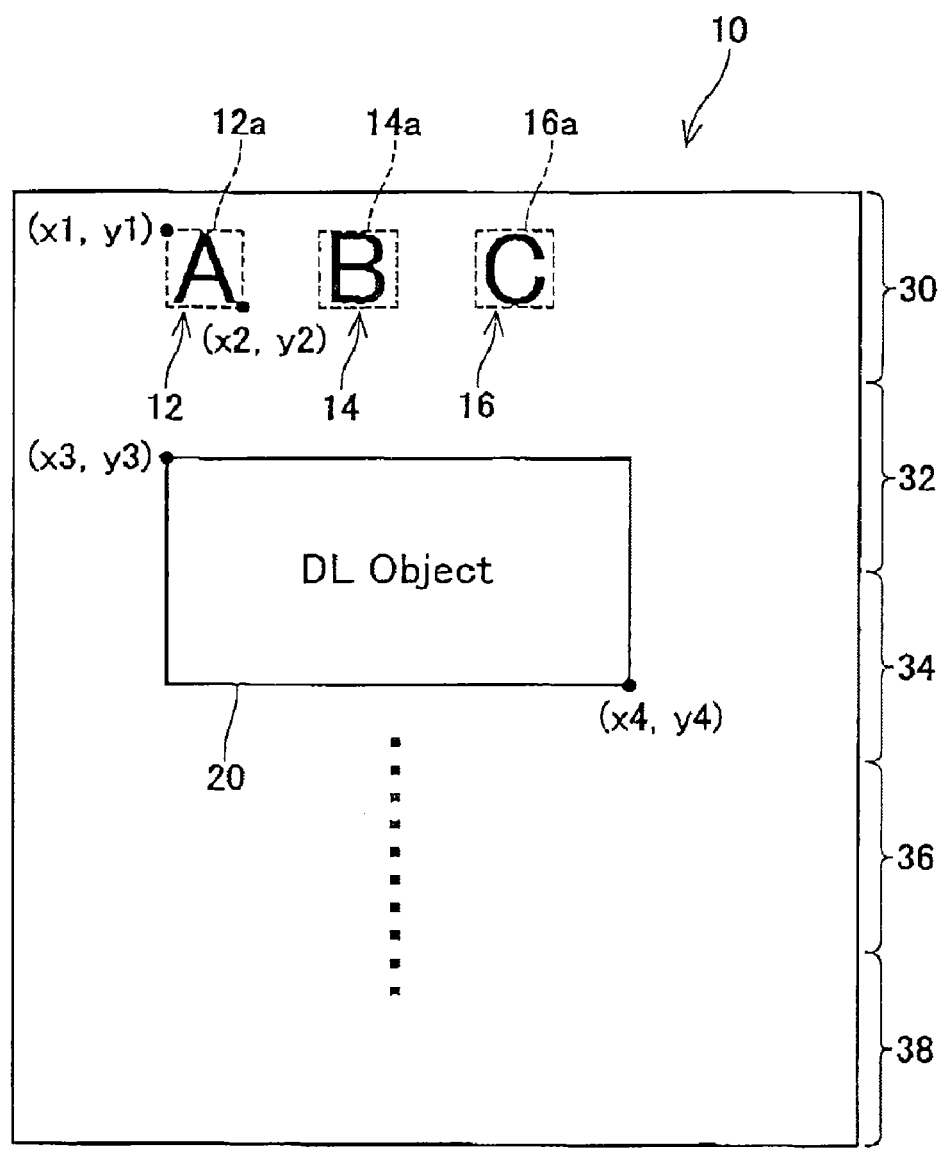
FIG. 1 shows an example of data that is to be rasterized.

The aforementioned rasterizing device may further comprise a device that creates converted data by converting an object included in the data to a quadrangle object that is positioned based on the apex coordinates of a quadrangle that includes the outer shape of the object. For example, the data 10 of FIG. 1 includes objects 12, 14, 16, 20. The objects 12, 14, 16 are not DL objects. The object 20 is a DL object. The rasterizing device will convert each object 12, 14, 16 and 20 into a quadrangle object. For example, the object 12 will be converted into a quadrangle object 12a that includes the outer shape of the object 12 ("A" in the example of FIG. 1). The quadrangle object 12a will be positioned by the coordinates of the apexes (x1, y1), (x2, y2) of the quadrangle. Note that in the example of FIG. 1, the quadrangle object (e.g., 12a) is positioned by the coordinates of the two apexes that are on one diagonal line of the quadrangle. However, the quadrangle object may be positioned by the coordinates of the three or four apexes of the quadrangle. Tn addition, the quadrangle object may be positioned by the coordinates of one apex of the quadrangle, the length of the long side of the quadrangle, and the length of the short side of the quadrangle. The quadrangle object may also be positioned by the coordinates of one apex of the quadrangle and the length of the diagonal line. The quadrangle object may also be positioned by the coordinates of any one apex of the quadrangle. Like with the object 12, the objects 14, 16 will also be converted into quadrangle objects 14a, 16a. The DL object 20 will also be converted into a quadrangle object (the apexes are (x3, y3) and (x4, y4)). Note that in the example of FIG. 1, because the shape of the DL object 20 is itself a quadrangle, the quadrangle object thereof is not illustrated.

The rasterizer may create bit-mapped data in band units from the aforementioned converted data. In addition, the rasterizer may determine that an object is to be included in each band based on the apex coordinates. For example, the rasterizer may determine whether or not the object 12 is to be included in band 30 based upon the coordinates (x1, y1) and/or the coordinates (x2, y2). It is difficult to determine the object to be included inside a band in a case where a quadrangle object is not used (e.g., a case where an object is positioned by data in vector format). In contrast, an object will be positioned by the coordinates of a simple quadrangle when this technology is used. Because of this, the rasterizer can easily specify an object to be included inside a band.

The aforementioned rasterizing device may further comprise a second storage area that is capable of storing bit-mapped data for at least one band, and a third storage area that is capable of storing bit-mapped data for at least one band. In this case, the rasterizer may alternately store the bit-mapped data for each band in the second storage area and the third storage area. For example, the bit-mapped data for the first band may be stored in the second storage area. The bit-mapped data for the second band that follows the first band may be stored in the third storage area. The bit-mapped data for the third band that follows the second band may be stored in the second storage area. In this way, the content stored in the second storage area may be updated. The bit-mapped data of the fourth band that follows the third band may be stored in the third storage area. In this way, the content stored in the third storage area may be updated. When performed in this manner, the processing time can be shortened because the bit-mapped data of one band can be printed while the rasterizing process of the following band is being executed. Note that the aforementioned "bit-mapped data for one band" may have a fixed value, or may have a variable value.

It is undeniable that the memory capacity of a printer is less than that of a PC or the like. Because of this, the aforementioned rasterizing device that can efficiently use memory can be optimally used in a printer. This printer may comprise the aforementioned rasterizing device and a printing device. This printing device may be capable of executing each of the following processes.

(A) printing on a print medium based on bit-mapped data of a first band in a case where the bit-mapped data of the first band is created by the rasterizing device.

(B) printing on the print medium based on bit-mapped data of a next band in a case where the bit-mapped data of the next band is created by the rasterizing device, and (C) repeating the process of (B) until the last band.

The following computer readable medium is also useful. This computer readable medium is used in order to achieve a rasterizing device that is capable of creating bit-mapped data in band units by rasterizing data including a DL object which is downloaded from a communication network. This computer readable medium includes instructions for ordering a computer mounted on the rasterizing device to perform each of the following processes:

With respect to a predetermined band in which a predetermined DL object is to be included, (1) downloading the predetermined DL object and storing it in a predetermined storage area in a case where the predetermined DL object has not been stored in the predetermined storage area, wherein the predetermined DL object will not be downloaded in a case where the predetermined DL object is stored in the predetermined storage area;

(2) rasterizing the predetermined DL object stored in the predetermined storage area; and (3) deleting the predetermined DL object from the predetermined storage area in a case where the bit-mapped data of the predetermined DL object for the predetermined band is created and the predetermined DL object is not to be included in a band after the predetermined band, wherein the predetermined DL object is not deleted from the predetermined storage area in a case where the predetermined DL object is to be included in the band after the predetermined band.

When this computer readable medium is used, it can achieve a rasterizing device that can efficiently create bit-mapped data in band units from data including a DL object.

The following method is also useful. This method will create bit-mapped data in band units by rasterizing data that includes a DL object which is to be downloaded from a communication network. This method comprises the following steps:

With respect to a predetermined band in which a predetermined DL object is to be included, (1) downloading the predetermined DL object and store it in a predetermined storage area in a case where the predetermined DL object has not been stored in the predetermined storage area, wherein the predetermined DL object is not downloaded in a case where the predetermined DL object has been stored in the predetermined storage area;

(2) rasterizing the predetermined DL object stored in the predetermined storage area; and (3) deleting the predetermined DL object from the predetermined storage area in a case where the bit-mapped data of the predetermined DL object for the predetermined band is created and the predetermined DL object is not to be included in a band after the predetermined band, wherein the predetermined DL object is not deleted from the predetermined storage area in a case where the predetermined DL object is to be included in the band after the predetermined band.

When this method is used, it can efficiently create bit-mapped data in band units from data including a DL object.

The present specification also discloses the following technology, which can achieve the rasterization of print data at high speeds. This technology is a print system that comprises a first printer, and a rasterizing device communicably connected to the first printer. This rasterizing device may be a printer separate from the first printer, or may be another type of device (a device other than a printer). The first printer may comprise a first rasterizer and a first printing device. The rasterizing device may comprise a second rasterizer. The first rasterizer and the second rasterizer may be capable of creating bit-mapped data of print data by jointly rasterizing the print data in a case where the first printer is commanded to print the print data. Note that the first rasterizer and the second rasterizer may always jointly rasterize the print data, or may not always do so. The first printing device may print onto a print medium based upon the bit-mapped data of the print data.

According to the aforementioned printer system, at least two rasterizers are capable of jointly rasterizing print data. In this case, there will be times in which the print data can be rasterized faster than when the print data is rasterized by one rasterizer. This system can achieve a print data rasterization speed that is faster than when the print data is always rasterized by one rasterizer. Note that the number of rasterizing devices is not limited to one. A system in which one printer and two or more rasterizing devices can jointly rasterize print data may also be constructed.

Each element of the aforementioned printer system may operate as follows. The first rasterizer may create first bit-mapped data by rasterizing a first predetermined portion of the print data in the case where the first printer is commanded to print the print data. The first printer may output to the rasterizing device a second predetermined portion of the print data other than the first predetermined portion. The second predetermined portion may be all portions of the print data other than the first predetermined portion, or may be some portion other than the first predetermined portion of the print data. The rasterizing device may input the second predetermined portion that was output from the first printer. The second rasterizer may create bit-mapped data by rasterizing the second predetermined portion that was input. The rasterizing device may output the second bit-mapped data that was created to the first printer. The first printer may input the second bit-mapped data that was output from the rasterizing device The first printing device may print onto a print medium based upon the bit-mapped data that includes the first bit-mapped data created by the first rasterizer and the second bit-mapped data that was input.

The aforementioned rasterizing device may be a second printer that further has a second printing device. In other words, the aforementioned printer system may be constructed by the first printer and the second printer. The aforementioned printer system may also be constructed by three or more printers. The first rasterizer and the second rasterizer may create bit-mapped print data by jointly rasterizing print data in a case where the second printer is commanded to print the print data. In this case, the second printing device may print onto a print medium based upon the bit-mapped data of the print data.

There are printers that will divide print data into a plurality of areas (bands) and rasterize them in the sequence in which each area is to be printed. In other words, there are printers that will create bit-mapped data in band units from the print data. When the bit-mapped data is created in band units, the memory capacity can be compressed in order to store the bit-mapped data. The printer system noted above may use a printer that will create bit-mapped data in band units. In other words, in a case where the first printer is commanded to print the print data, the first rasterizer and the second rasterizer may create bit-mapped data for one band included in the print data by jointly rasterizing that band. This printer system can achieve the creation of bit-mapped data for each band at high speeds.

The aforementioned printer system may have the following characteristics in a case where bit-mapped data is to be created in band units. In other words, only the first rasterizer will be selected to create bit-mapped data for the band, or the first rasterizer and the second rasterizer will be selected to jointly create bit-mapped data for the band, depending upon the print data included in the band. This selection may be executed by the first printer, or may be executed by another device. For example, in a case where a PC connected to the first printer is present, and that PC commands the first printer to print, the aforementioned selection may be executed by that PC.

Any of the following methods may be used, and the aforementioned selection may be executed.

(1) In a case where two or more objects are included in the bands the first rasterizer and the second rasterizer may be jointly selected to create bit-mapped data for that band. In this case, one of the objects may be rasterized by the first rasterizer, and the other objects may be rasterized by the second rasterizer. Because a plurality of objects included in a band will be jointly rasterized, the creation of bit-mapped data for that band can be achieved at high speed.

(2) In a case where two or more DL objects that should be downloaded from a communication network are included in the band, the first rasterizer and the second rasterizer may be jointly selected to create bit-mapped data for that band. In this case, one of the DL objects may be downloaded and rasterized by the first rasterizer, and the other of the DL objects may be downloaded and rasterized by the second rasterizer. On the other hand, each DL object may be downloaded by the first printer or rasterizing device, one of the DL objects may be rasterized by the first printer, and the other of the DL objects may be rasterized by the rasterizing device. Because a plurality of DL objects included in a band will be jointly rasterized, the creation of bit-mapped data for that band can be achieved at high speed.

(3) In a case where a DL object that should be downloaded from a communication network and a non-DL object is included in the band, the first rasterizer and the second rasterizer may be jointly selected to create bit-mapped data for that band. The aforementioned non-DL object is an object that does not need to be downloaded from the communication network. The aforementioned DL object may be rasterized by the first rasterizer, and the aforementioned non-DL object may be rasterized by the second rasterizer. On the other hand, the aforementioned DL object may be rasterized by the second rasterizer, and the aforementioned non-DL object may be rasterized by the first rasterizer. The time needed to rasterize the non-DL object will be comparatively short, and the time needed to rasterize the DL object will be comparatively long. The first printer that was commanded to print should execute various processes in parallel. The first printer may cause the second rasterizer to execute the rasterization of the DL object that needs a long period of time, and during that period of time, the first printer may rasterize the non-DL object in a short period of time as well as execute other processes. This method can efficiently create bit-mapped data.

(4) A first processing time for only the first rasterizer to create bit-mapped data for the band may be compared with a second processing time for the first rasterizer and the second rasterizer to jointly create bit-mapped data for the band.

(4-1) In a case where the first processing time is smaller than the second processing time, only the first rasterizer may be selected to create bit-mapped data for the band.

(4-2) In a case where the second processing time is smaller than the first processing time, the first rasterizer and the second rasterizer may be jointly selected to create bit-mapped data for the band.

In this method, the shorter amount of time for creating bit-mapped data will be selected. Because of this, a reduction in time for creating bit-mapped data will be ensured.

If the next printer is used, the aforementioned printer system can be constructed. This printer is communicably connected to and used with a rasterizing device comprising an external side rasterizer. This printer comprises a printer-side rasterizer, an output device, an input device, and a printing device. The printer-side rasterizer is capable of creating first bit-mapped data by rasterizing a first predetermined portion of the print data in a case where the printer is commanded to print the print data. The output device may output to the rasterizing device a second predetermined portion of the print data other than the first predetermined portion. The input device may input the second bit-mapped data that was created by the external side rasterizer and output from the rasterizing device. The printing device may print onto a print medium based upon bit-mapped data that includes the first bit-mapped data created by the print-side rasterizer, and the second bit-mapped data that was input. This printer can rasterize print data together with the rasterizing device. According to this printer, an increase in the speed of rasterization can be achieved.

The present specification discloses a computer readable medium for achieving the aforementioned printer. This computer readable medium includes instructions for ordering a computer mounted on the printer to execute each of the following processes:
(1) A first creation process that creates first bit-mapped data by rasterizing a first predetermined portion of print data in a case where the printer is commanded to print the print data.
(2) A second creation process in which a second predetermined portion of the print data other than the first predetermined portion is output to the rasterizing device, and the second predetermined portion is rasterized by the rasterizing device to create second bit-mapped data.
(3) A process that prints onto a print medium based upon bit-mapped data that includes the first bit-mapped data created by the first creation process, and the second bit-mapped data that was created by the second creation process.

In addition, the following rasterization method is also useful. This rasterization method will be executed by a printer that is communicably connected to a rasterizing device comprising an external side rasterizer. This method comprises the following steps:
(1) A first creation step that creates first bit-mapped data by rasterizing a first predetermined portion of print data in a case where the printer is commanded to print the print data.
(2) A second creation step in which a second predetermined portion of the print data other than the first predetermined portion is output to the rasterizing device, and the second predetermined portion is rasterized by the rasterizing device to create second bit-mapped data.
(3) A step that prints onto a print medium based upon bit-mapped data that includes the first bit-mapped data created in the first creation step, and the second bit-mapped data that was created in the second creation step.

Specific examples of the present invention were described in detail above, however these are simply illustrations, and do not limit the scope of the claims. The specific examples illustrated above include various modifications and changes that are within the technology disclosed in the scope of the patent claims. In addition, the technological components described in the present specification or the drawings exhibit technological utility individually or in various combinations, and are not limited to the combinations disclosed in the claims at the time of application. Furthermore, the technology illustrated in the present specification or the drawings simultaneously achieves a plurality of objects, and has technological utility by achieving one of these objects.

What is claimed is:

1. A rasterizing device to be connected to a communication network, the rasterizing device configured to rasterize data including a DL object which is to be downloaded from the communication network, the rasterizing device comprising:
a first storage area configured to store a downloaded DL object;
a rasterizer that creates bit-mapped data in band units by rasterizing the data;
a second storage area configured to store the bit-mapped data of at least one band; and
a print controller,
wherein, with respect to a predetermined band in which a predetermined DL object is to be included,
(1) the rasterizer downloads the predetermined DL object and stores it in the first storage area when the predetermined DL object has not been stored in the first storage area, wherein the predetermined DL object is not downloaded when the predetermined DL object has been stored in the first storage area,
(2) the rasterizer rasterizes the predetermined DL object stored in the first storage area, and
(3) the rasterizer determines whether the predetermined DL object is to be included in a band after the predetermined band,
the rasterizer:
deletes the predetermined DL object from the first storage area when bit-mapped data of the predetermined DL object for the predetermined band is created and it is determined that the predetermined DL object is not to be included in the band after the predetermined band, and
does not delete the predetermined DL object from the first storage area when the bit-mapped data of the predetermined DL object for the predetermined band is created and it is determined that the predetermined DL object is to be included in the band after the predetermined band,
wherein the print controller causes a printing device to perform a print based on the bit-mapped data stored in the second storage area,
and when the print controller causes the printing device to perform the print based on the bit-mapped data for the predetermined band stored in the second storage area, the bit-mapped data for the predetermined band including the bit-mapped data of the predetermined DL object is deleted from the second storage area even if it is determined that the predetermined DL object is to be included in the band after the predetermined band.

2. The rasterizing device as in claim 1, wherein,
in the process of (3),
the rasterizer determines whether the predetermined DL object is to be included in a next band of the predetermined band,
the rasterizer deletes the predetermined DL object from the first storage area when the bit-mapped data of the predetermined DL object for the predetermined band is created and it is determined that the predetermined DL object is not to be included in the next band, and
the rasterizer does not delete the predetermined DL object from the first storage area when the bit-mapped data of the predetermined DL object for the predetermined band is created and it is determined that the predetermined DL object is to be included in the next band.

3. The rasterizing device as in claim 1, wherein,
in the process of (3),
the rasterizer determines whether the predetermined DL object is to be included in any of bands after the predetermined band,
the rasterizer deletes the predetermined DL object from the first storage area when the bit-mapped data of the predetermined DL object for the predetermined band is created and it is determined that the predetermined DL object is not to be included in any of the bands, and
the rasterizer does not delete the predetermined DL object from the first storage area when the bit-mapped data of the predetermined DL object for the predetermined band is created and it is determined that the predetermined DL object is to be included in any of the bands.

4. The rasterizing device as in claim 1, further comprising:
a device that creates converted data by converting an object included in the data to a quadrangle object that is positioned based on the apex coordinates of a quadrangle that includes the outer shape of the object,
wherein the rasterizer creates the bit-mapped data in band units from the converted data, and the rasterizer determines an object to be included in each band based on the apex coordinates.

5. The rasterizing device as in claim 1, further comprising:
a third storage area configured to store the bit-mapped data of at least one band,
wherein the rasterizer stores the bit-mapped data of each band in the second storage area and the third storage area alternately.

6. The rasterizing device as in claim 1, wherein
in the process of (3),
the rasterizer deletes the predetermined DL object from the first storage area by a timing at which the rasterizer starts to create bit-mapped data for a next band of the predetermined band.

7. The rasterizing device as in claim 1, wherein
in the process of (3),
the rasterizer deletes the predetermined DL object from the first storage area when the bit-mapped data of the predetermined DL object for the predetermined band is created, it is determined that the predetermined DL object is not to be included in the band after the predetermined band, and a free space of the first storage area is less than a predetermined value.

8. The rasterizing device as in claim 1, wherein
in the process of (3),
the rasterizer does not delete the predetermined DL object before rasterization in the case where the bit-mapped data of the predetermined DL object for the predetermined band is created and it is determined that the predetermined DL object is to be included in the band after the predetermined band.

9. The rasterizing device as in claim 1, wherein
in the process of (3),
the rasterizer does not delete the bit-mapped data of the predetermined DL object in the case where the bit-mapped data of the predetermined DL object for the predetermined band is created and it is determined that the predetermined DL object is to be included in the band after the predetermined band.

10. The rasterizing device as in claim 1, wherein
in the process of (3),
the rasterizer determines whether the predetermined DL object is to be included in the band after the predetermined band by checking whether, after the URL of the predetermined DL object, the same URL is included in the data.

11. The rasterizing device as in claim 10, further comprising:
a combination storage area configured to store a combination of the URL of the predetermined DL object and an information for determining a last band in which the predetermined DL object is to be included,
the rasterizer determines whether the predetermined DL object is to be included in the band after the predetermined band based on the combination stored in the combination storage area.

12. A printer comprising:
the rasterizing device as in claim 1, and
the printing device capable of performing following processes:
(A) printing on a print medium based on bit-mapped data of a first band when the bit-mapped data of the first band is created by the rasterizing device,
(B) printing on the print medium based on bit-mapped data of a next band when the bit-mapped data of the next band is created by the rasterizing device, and
(C) repeating the process of (B) until the last band.

13. A non-transitory computer readable medium for achieving a rasterizing device configured to create bit-mapped data in band units by rasterizing data including a DL object which is to be downloaded from a communication network, the rasterizing device comprising a first storage area configured to store a downloaded DL object and a second storage area configured to store the bit-mapped data of at least one band, the computer readable medium including instructions for ordering a computer mounted on the rasterizing device to perform:
with respect to a predetermined band in which a predetermined DL object is to be included,
(1) downloading the predetermined DL object and storing it in the first storage area when the predetermined DL object has not been stored in the first storage area, wherein the predetermined DL object is not downloaded when the predetermined DL object has been stored in the first storage area,
(2) rasterizing the predetermined DL object stored in the first storage area, and
(3) determining whether the predetermined DL object is to be included in a band after the predetermined band, and deleting the predetermined DL object from the first storage area when bit-mapped data of the predetermined DL object for the predetermined band is created and it is determined that the predetermined DL object is not to be included in the band after the predetermined band, wherein the predetermined DL object is not deleted from the first storage area when the bit-mapped data of the predetermined DL object for the predetermined band is created and it is determined that the predetermined DL object is to be included in the band after the predetermined band; and
causing a printing device to perform a print based on the bit-mapped data stored in the second storage area,
when the printing device performs the print based on the bit-mapped data for the predetermined band stored in the second storage area, the bit-mapped data for the predetermined band including the bit-mapped data of the predetermined DL object is deleted from the second storage area even if it is determined that the predetermined DL object is to be included in the band after the predetermined band.

14. A method performed by a rasterizing device configured to create bit-mapped data in band units by rasterizing data including a DL object which is to be downloaded from a communication network, the rasterizing device comprising a first storage area configured to store a downloaded DL object and a second storage area configured to store the bit-mapped data of at least one band, the method comprising:
with respect to a predetermined band in which a predetermined DL object is to be included,
(1) downloading the predetermined DL object and storing it in the first storage area when the predetermined DL object has not been stored in the first storage area, wherein the predetermined DL object is not downloaded when the predetermined DL object has been stored in the first storage area,
(2) rasterizing the predetermined DL object stored in the first storage area, and
(3) determining whether the predetermined DL object is to be included in a band after the predetermined band, and deleting the predetermined DL object from the first storage area when bit-mapped data of the predetermined DL object for the predetermined band is created and it is determined that the predetermined DL object is not to be included in the band after the predetermined band, wherein the predetermined DL object is not deleted from the first storage area when the bit-mapped data of the predetermined DL object for the predetermined band is created and it is determined that the predetermined DL object is to be included in the band after the predetermined band; and causing a printing device to perform a print based on the bit-mapped data stored in the second storage area, when the printing device performs the print based on the bit-mapped data for the predetermined band stored in the second storage area, the bit-mapped data for the predetermined band including the bit-mapped data of the predetermined DL object is deleted from the second storage area even if it is determined that the predetermined DL object is to be included in the band after the predetermined band.

* * * * *